(12) United States Patent
Aoki et al.

(10) Patent No.: US 10,310,565 B2
(45) Date of Patent: Jun. 4, 2019

(54) FLEXIBLE DISPLAY STRUCTURE

(71) Applicant: Intel Corporation, Santa Clara, CA (US)

(72) Inventors: Russell S. Aoki, Tacoma, WA (US); Aleksander Magi, Aloha, OR (US); Mark Angus MacDonald, Beaverton, OR (US); Michael Ahrens, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/577,287

(22) PCT Filed: Jun. 27, 2015

(86) PCT No.: PCT/US2015/038199
§ 371 (c)(1),
(2) Date: Nov. 27, 2017

(87) PCT Pub. No.: WO2017/003415
PCT Pub. Date: Jan. 5, 2017

(65) Prior Publication Data
US 2018/0150112 A1 May 31, 2018

(51) Int. Cl.
*G06F 1/16* (2006.01)
*H04M 1/02* (2006.01)
*G06F 3/041* (2006.01)

(52) U.S. Cl.
CPC .......... *G06F 1/1681* (2013.01); *G06F 1/1616* (2013.01); *G06F 1/1618* (2013.01); *G06F 1/1652* (2013.01); *H04M 1/0268* (2013.01); *G06F 3/041* (2013.01); *G06F 2203/04102* (2013.01); *H04M 1/0216* (2013.01); *H04M 1/0237* (2013.01)

(58) Field of Classification Search
CPC .... G06F 1/1616; G06F 1/1618; G06F 1/1652; G06F 1/1681; G06F 2203/04102; G06F 3/041; H04M 1/0216; H04M 1/0237; H04M 1/0268
See application file for complete search history.

(56) References Cited

U.S. PATENT DOCUMENTS

| | | | |
|---|---|---|---|
| 9,606,583 B2* | 3/2017 | Ahn | G06F 1/1641 |
| 2015/0077917 A1* | 3/2015 | Song | G06F 1/1652 |
| | | | 361/679.27 |
| 2016/0011628 A1* | 1/2016 | Sato | G06F 1/1656 |
| | | | 361/679.3 |
| 2016/0370828 A1* | 12/2016 | Hsu | G06F 1/1681 |

FOREIGN PATENT DOCUMENTS

| | | |
|---|---|---|
| KR | 20130073331 A | 7/2013 |
| KR | 20140002243 A | 1/2014 |
| KR | 20140091273 A | 7/2014 |
| KR | 20150037383 A | 4/2015 |

OTHER PUBLICATIONS

International Search Report and Written Opinion dated Mar. 22, 2016 for PCT Application No. PCT/US2015/038199; 11 pages.

* cited by examiner

*Primary Examiner* — James Wu
(74) *Attorney, Agent, or Firm* — Patent Capital Group

(57) ABSTRACT

Particular embodiments described herein provide for an electronic device that includes a flexible display and a support for the flexible display. The support includes a main support structure, at least one curve crease, and a curve region, wherein the curve region includes a curve support.

16 Claims, 30 Drawing Sheets

FLEXIBLE DISPLAY STRUCTURE

TECHNICAL FIELD

This Application is a national stage application under 35 U.S.C. § 371 of PCT Application PCT/US2015/038199, filed Jun. 27, 2015 and entitled "FLEXIBLE DISPLAY STRUCTURE", which is incorporated herein by reference in its entirety. The disclosure of the prior application is considered part of and are hereby incorporated by reference in its entirety in the disclosure of this application.

BRIEF DESCRIPTION OF THE DRAWINGS

To provide a more complete understanding of the present disclosure and features and advantages thereof, reference is made to the following description, taken in conjunction with the accompanying FIGURES, embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
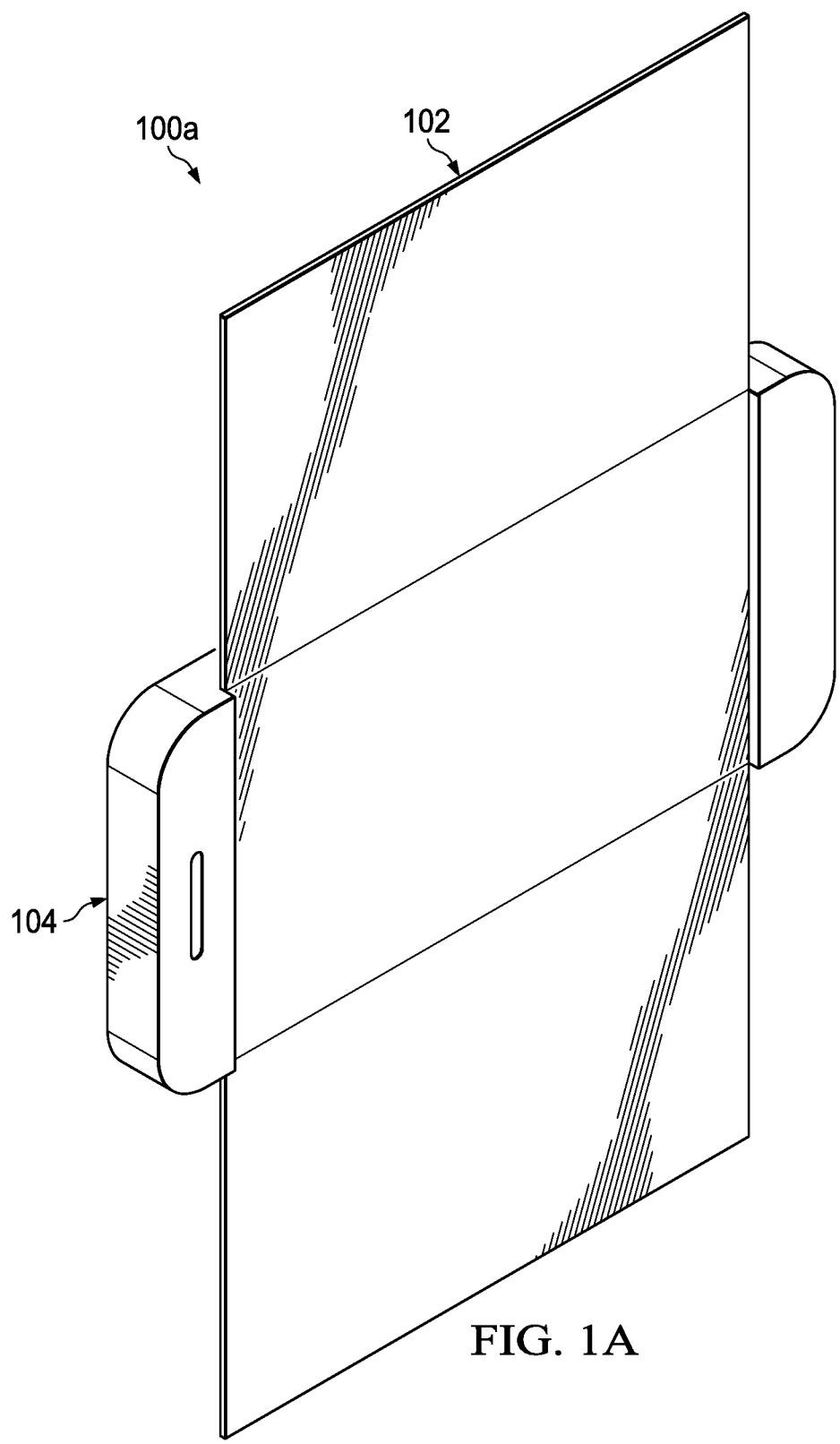
FIG. 1A is a simplified schematic diagram illustrating a plan view of an embodiment of an electronic device with a flexible display structure, in accordance with one embodiment of the present disclosure.

FIG. 1A is a simplified plan view illustrating an embodiment of an electronic device 100a in accordance with one embodiment of the present disclosure. Electronic device 100 can include a flexible display 102 and a first housing 104. In this configuration, electronic device 100 may have a profile similar to a tablet.

In one or more embodiments, electronic device 100 is a tablet computer. In still other embodiments, electronic device 100 may be any suitable electronic device having a display such as a mobile device, a tablet device (e.g., i-Pad™), Phablet™, a personal digital assistant (PDA), a smartphone, an audio system, a movie player of any type, etc. The electronics (e.g., processor, memory, etc.) for electronic device 100 reside in first housing 104.

In one or more embodiments, flexible display 102 can be a flexible display screen such as a flexible liquid crystal display (LCD) display screen, a flexible light-emitting diode (LED) display screen, a flexible organic light-emitting diode (OLED) display screen, a flexible plasma display screen, or any other suitable flexible display screen system. Flexible display 102 can include a touchscreen that can detect the presence and location of a touch within the display area. In another embodiment, first housing 104 may include a battery and various electronics (e.g., processor, memory, etc.) to allow first housing 104 to operate as a standalone tablet. In another embodiment, first housing 104 may include a wireless module (e.g., Wi-Fi module, Bluetooth module, etc.). In yet another embodiment, first housing 104 may include a camera, a microphone, and speakers.

Figure 1B:
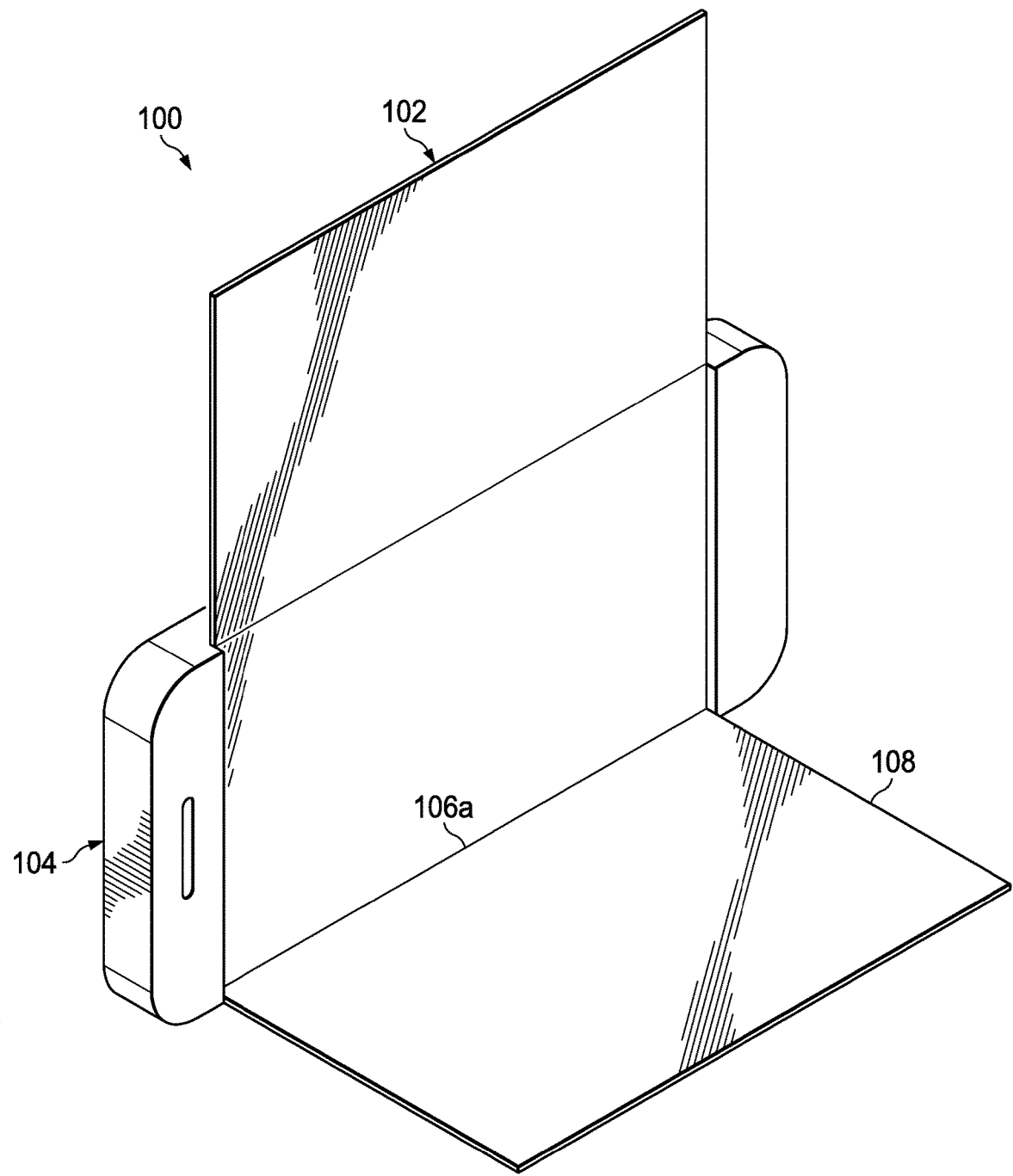
FIG. 1B is a simplified schematic diagram illustrating a plan view of an embodiment of an electronic device with a flexible display structure, in accordance with one embodiment of the present disclosure.

Turning to FIG. 1B, FIG. 1B is a simplified plan view illustrating an embodiment of electronic device 100 in accordance with one embodiment of the present disclosure. As illustrated in FIG. 1B, flexible display 102 has been bent or curved along curve crease 106a to create bended area 108. Electronic device 100 can include a flexible display structure to allow flexible display 102 to bend into various configurations.

Figure 1C:
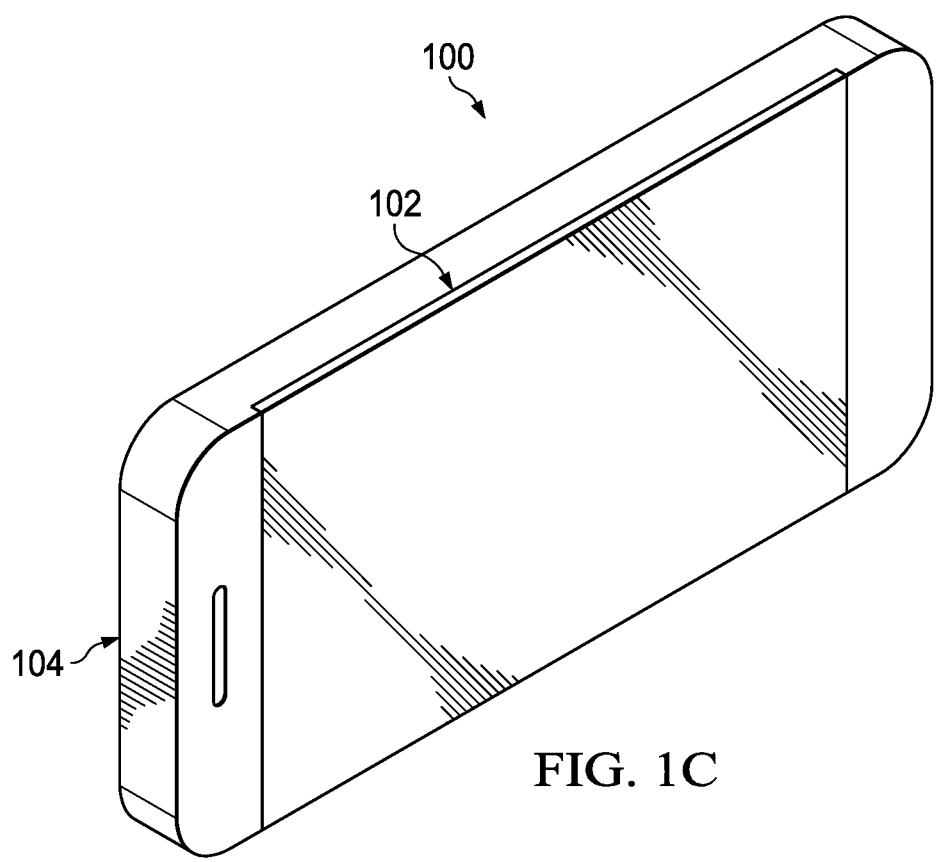
FIG. 1C is a simplified schematic diagram illustrating a plan view of an embodiment of an electronic device with a flexible display structure, in accordance with one embodiment of the present disclosure.

Turning to FIG. 1C, FIG. 1C is a simplified plan view illustrating an embodiment of an electronic device 100 in accordance with one embodiment of the present disclosure. As illustrated in FIG. 1C, flexible display 102 has been bent or folded around first housing 104. In this configuration, electronic device 100 may have a profile similar to a smartphone.

In an example, electronic device 100 can include various components of the internal electronic system of electronic device 100. The components may include a central processing unit (CPU), a memory, etc. Any processors (inclusive of digital signal processors, microprocessors, supporting chipsets, etc.), memory elements, etc. can be suitably coupled to a motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate.

For purposes of illustrating certain example features of electronic device 100 and flexible display 102, the following foundational information may be viewed as a basis from which the present disclosure may be properly explained. Flexible displays are an emerging technology that will allow creative new form factors in mobile, tablet, phones, 2 in 1's, laptops, desktops, AIO's, wearables and beyond. In order for this technology to be easily implemented into a system, a mechanism must be designed to provide protection and support for the flexible display but still allow the flexible display to bend. The mechanism should be able to protect the display from over bending or creasing by limiting the bend angle to about one hundred and eight degrees or less.

A support for a flexible display as outlined here can resolve these issues (and others). In an example, the support can include a spine like structure with individual vertebrae that can rotate in one rotational axis while providing stability in the other axis (much like a bicycle chain). The spine assembly of vertebrae is fixed to a thin sheet stamping to help control the bending location while keeping other areas rigid. The thin sheet stamping can also be the substrate for the flexible display. The individual vertebrae can nest in one another and share a common axis for rotation between the two. The common axis may have a threaded rod from one vertebra that passes through a snap slot in a second vertebra. A female threaded nut can attach to the threaded rod capturing a series of Belleville washers. When screwed down, the Belleville washers can produce friction/torque that will allow the two vertebra to rotate with the appropriate friction that will allow a position to be held (e.g., similar to how clamshell style hinges are made). The vertebrae can also have cam surfaces that will limit the rotation of the vertebra to a desired bend angle (e.g., about one hundred and eight degrees or less). This will keep the display from having an acute angle that can damage or permanently deform it.

A thin sheet stamped component can be a substrate or interface between the vertebrae assembly and the display. A series of slots can be incorporated to serve as the mechanical attach of each component. The slots may be required to control the mismatch in arc lengths as the device is bent from one direction to another. The assembly can be pocketed and relieved to allow for cable routing, and other electrical component placement.

Another example include the support for the flexible display can include a series of multiple sliding parallel plates that create a flexible, predictable structure while friction between the plates allows them to hold their desired deformed position. The sliding friction is a result in mismatch of arc lengths between the plates when they are bent. In an example, there can be an inner array of individual stamped components that are nested together much like scales on fish. These are allowed to translate relative to one another in one axis and can have a cantilever section which is the component that allows bending to occur in the array Two outer plates (plates 1 and 2) may sandwich the inner array of individual stamped components and both plates may be stamped out of spring steel that allow a great amount of flexure. The primary function of the two plates is to cinch together the sandwich structure with small fasteners. The cinching of the assembly creates compression on the inner plate array which in turn creates friction between all plates. This can allow the assembly to bend while also being capable of retaining is bent shape. Cut slots in the individual stamped components can control the amount of sliding displacement between the plates which in turn controls the amount of bend angle the assembly can accommodate per the product design intent.

Figure 2:
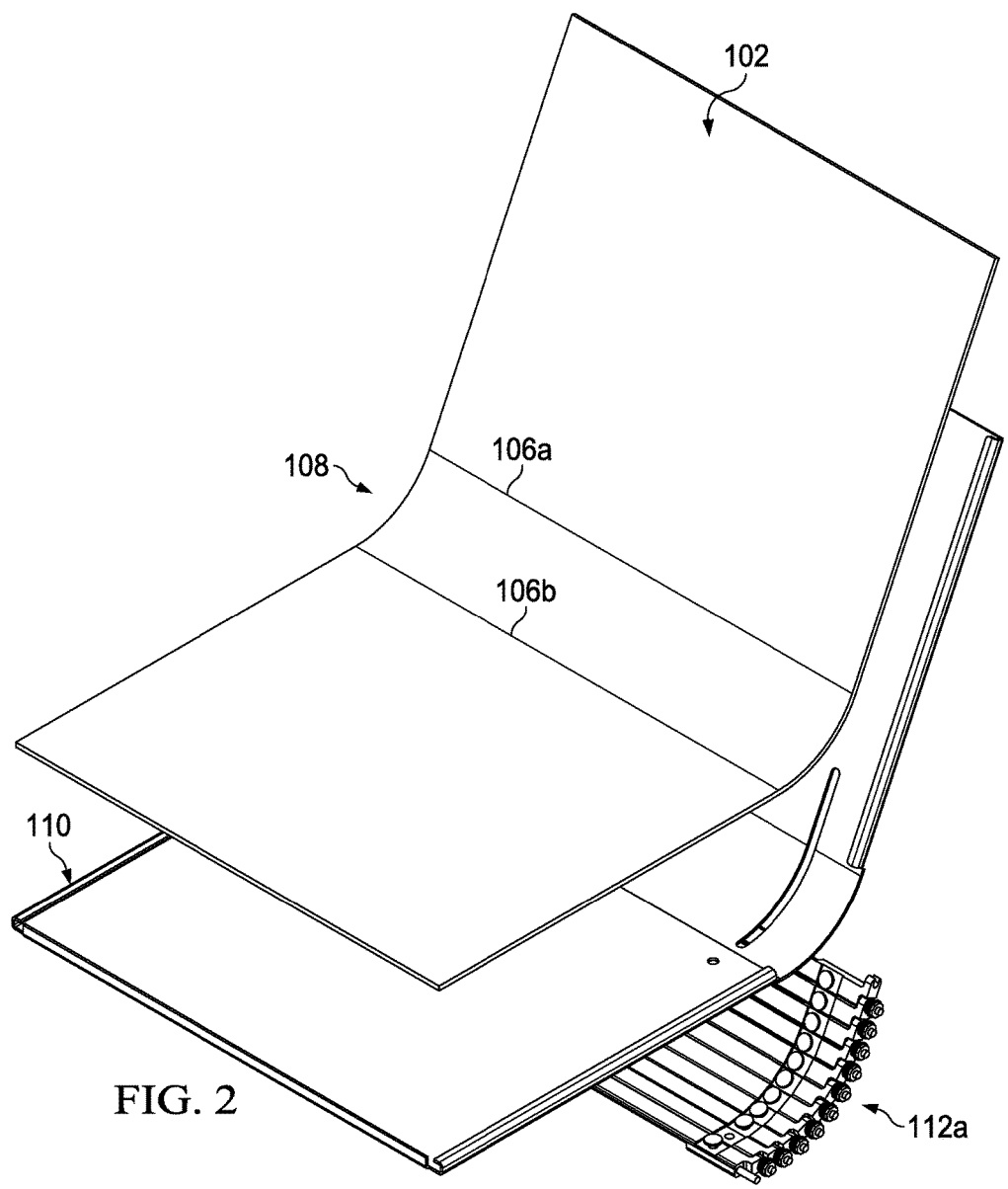
FIG. 2 is a simplified schematic diagram illustrating a plan view of an embodiment of a flexible display structure, in accordance with one embodiment of the present disclosure.

In another example, the support for the flexible display can include bistable steel. For example, bistable steel segments may be used as a horizontal hinge for the flexible display and allow a user to relatively easily expand the screen from folded and to flat single screen. A characteristic of the bistable can positively "lock" the screen expanded configuration and provide a stable angle when "closed." The bistable steel support can be paired with magnetic attachments for a tri-fold and dual-fold profile to keep the screen folded/closed in place, without the need of mechanical latches Turning to FIG. 2, FIG. 2 is a simplified exploded plan view illustrating an embodiment of flexible display 102 in accordance with one embodiment of the present disclosure. Flexible display 102 can include curve creases 106*a* and 106*b*, a curved area 108, main support structure 110, and curve support 112*a*. Main support structure 110 can be stamped flexible metal or some other similar flexible rigid or semi rigid material.

Figure 3:
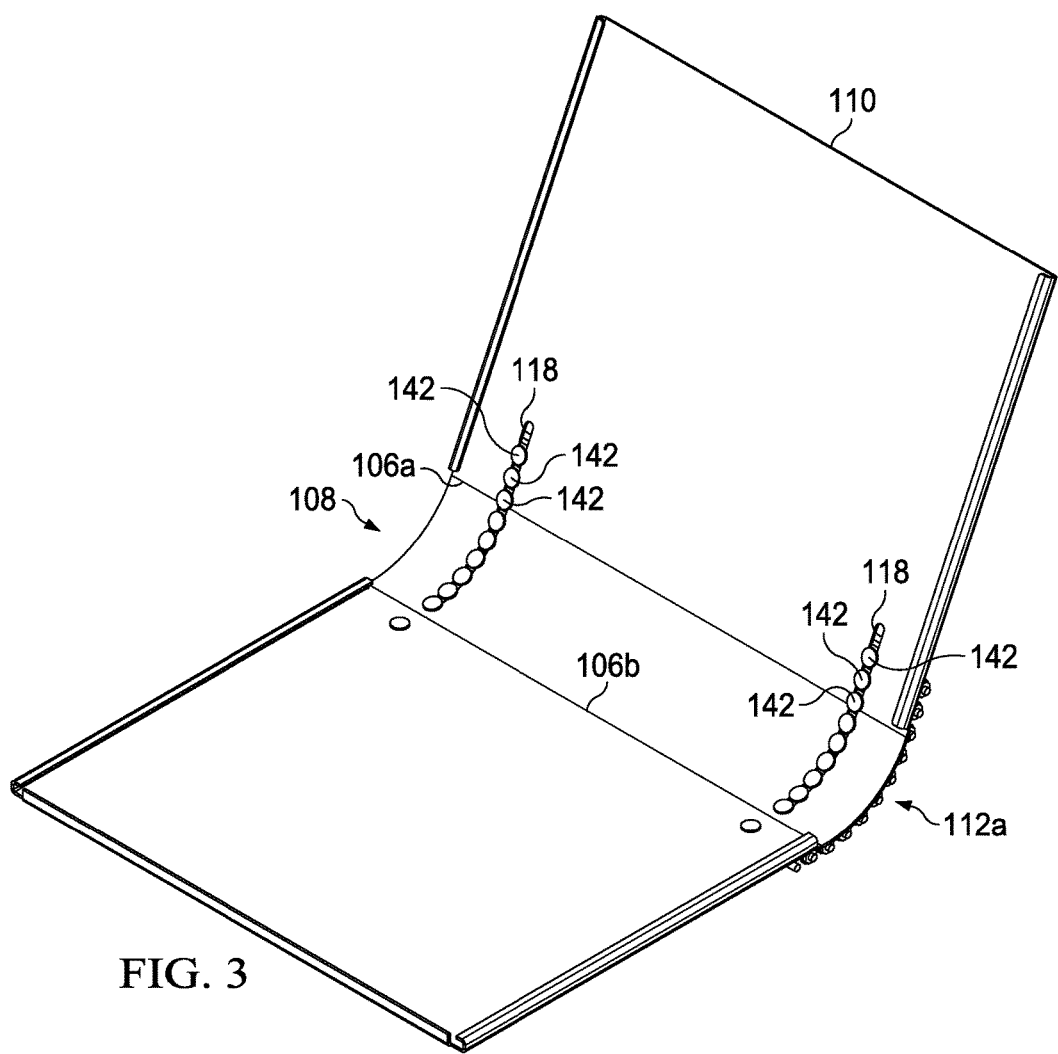
FIG. 3 is a simplified schematic diagram illustrating an exploded plan view of an embodiment of a flexible display structure, in accordance with one embodiment of the present disclosure.

Turning to FIG. 3, FIG. 3 is a simplified plan view illustrating an embodiment of a portion of flexible display 102 in accordance with one embodiment of the present disclosure. Main support structure 110, can include curve creases 106*a* and 106*b*. Curve support 112*a* can provide support for flexible display 102 along curved area 108 of flexible display 102. Curve support 112*a* can be coupled to main support structure 110 using securing fasteners 142. Main support structure 110 can include a securing fastener channel 118 to allow securing fasteners 142 some movement when main support structure 110 (and flexible display 102) is curved or bent.

Figure 4:
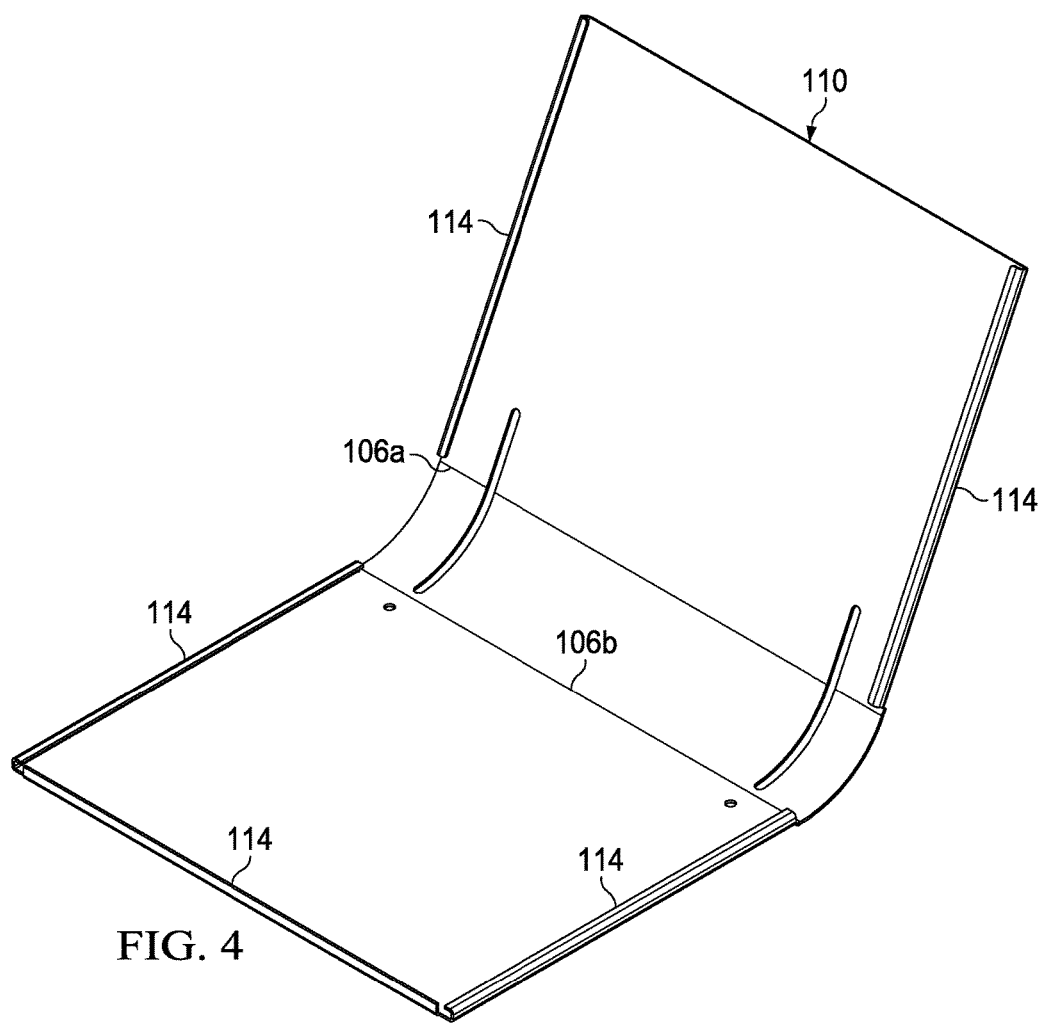
FIG. 4 is a simplified schematic diagram illustrating a plan view of an embodiment of a portion of a flexible display structure, in accordance with one embodiment of the present disclosure.

Turning to FIG. 4, FIG. 4 is a simplified plan view illustrating an embodiment of a portion of flexible display 102 in accordance with one embodiment of the present disclosure. Main support structure 110 can include curve creases 106*a* and 106*b* and flanges 114. Flanges 114 can help hold flexible display 102 in or on main support structure 110.

Figure 5:
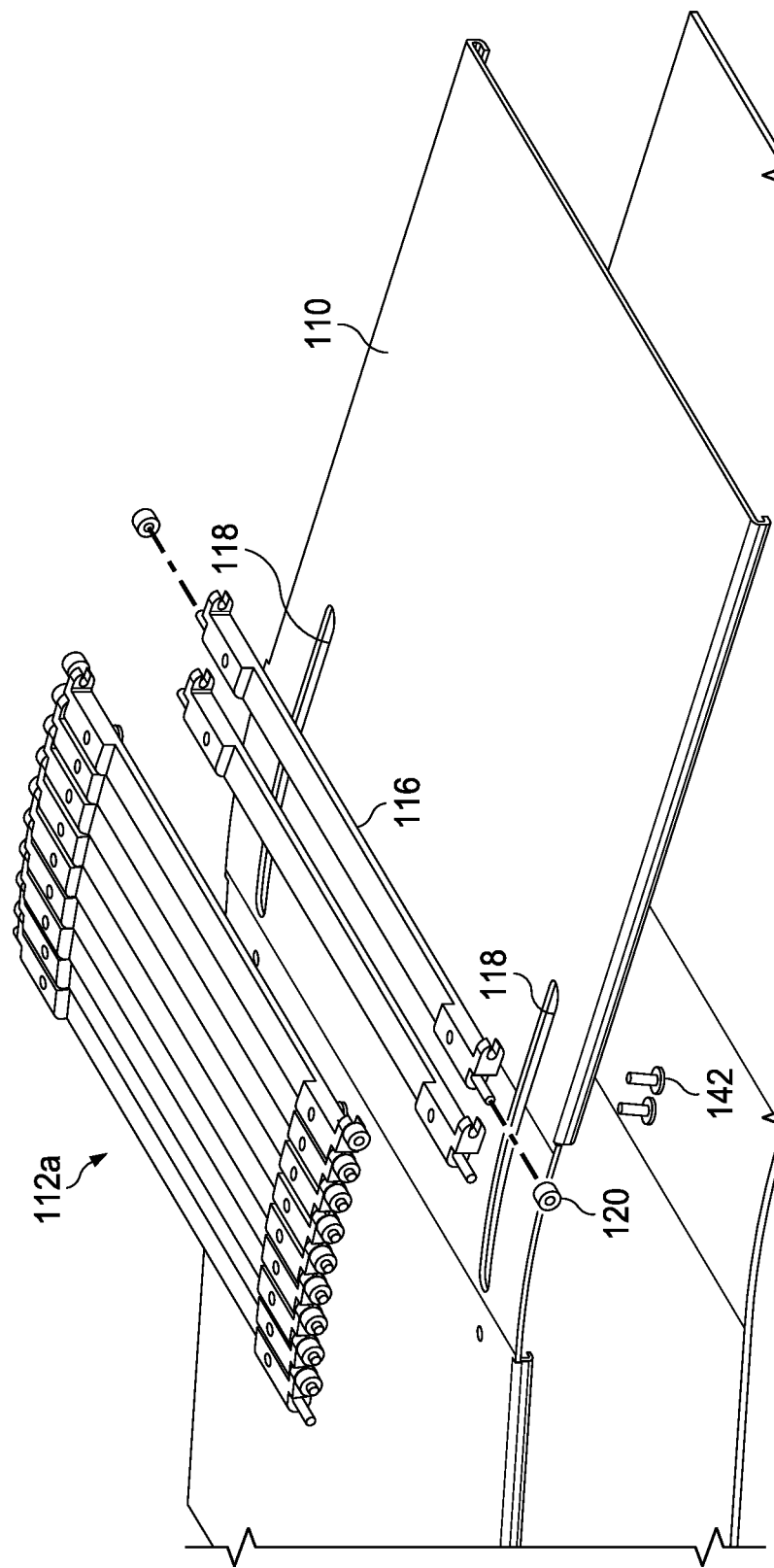
FIG. 5 is a simplified schematic diagram illustrating a plan view of an embodiment of flexible display structure, in accordance with one embodiment of the present disclosure.

Turning to FIG. 5, FIG. 5 is a simplified plan view illustrating an embodiment of a portion of flexible display 102 in accordance with one embodiment of the present disclosure. Curve support 112*a* can include individual vertebrae 116 and Belleville washers 120. Each individual vertebrae 116 can be coupled to another individual vertebrae 116 and held together using Belleville washers 120.

Figure 6:
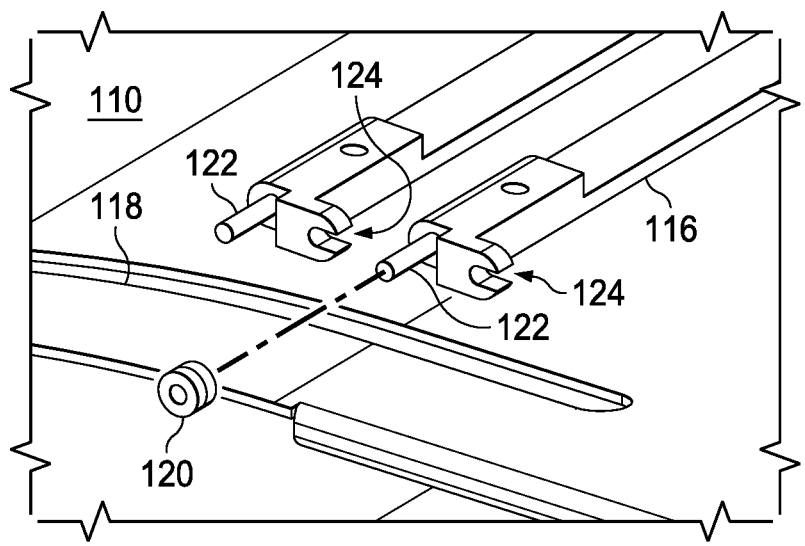
FIG. 6 is a simplified schematic diagram illustrating a plan view of an embodiment of a portion of a flexible display structure, in accordance with one embodiment of the present disclosure.

Turning to FIG. 6, FIG. 6 is a simplified plan view illustrating an embodiment of a portion of flexible display 102 in accordance with one embodiment of the present disclosure. Each individual vertebrae 116 can include a male interlocking feature 122 and a mating female interlocking feature 124. When one vertebrae 116 is coupled to another vertebrae 116, female interlocking feature 124 can surround and engage male interlocking feature 122.

Figure 7:
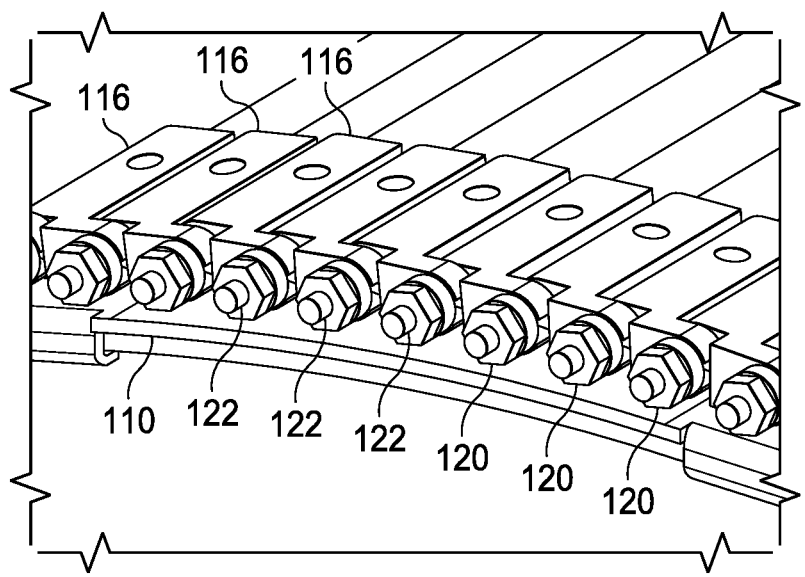
FIG. 7 is a simplified schematic diagram illustrating a plan view of an embodiment of a portion of a flexible display structure, in accordance with one embodiment of the present disclosure.

Turning to FIG. 7, FIG. 7 is a simplified plan view illustrating an embodiment of a portion of flexible display 102 in accordance with one embodiment of the present disclosure. After female interlocking feature 124 has surrounded and engaged male interlocking feature 122, Belleville washer 120 can be used to secure each vertebrae 116 to the other. For example, Belleville washer 120 can be inserted over male interlocking feature 122 and help prevent the decoupling of vertebrae 116.

Figure 8:
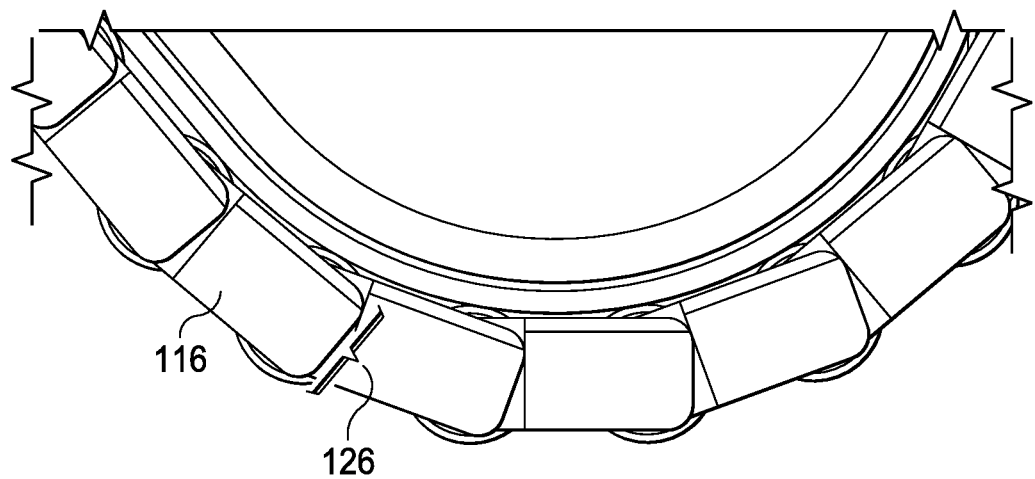
FIG. 8 is a simplified schematic diagram illustrating a plan view of an embodiment of a portion of a flexible display structure, in accordance with one embodiment of the present disclosure.

Turning to FIG. 8, FIG. 8 is a simplified plan view illustrating an embodiment of a portion of flexible display 102 in accordance with one embodiment of the present disclosure. As illustrated in FIG. 8, and edge profile 126 of each vertebrae 116 can be somewhat curved. The curved edge profile 126 can allow for relative smooth bending of curve support 112*a* and flexible display 102.

Figure 9:
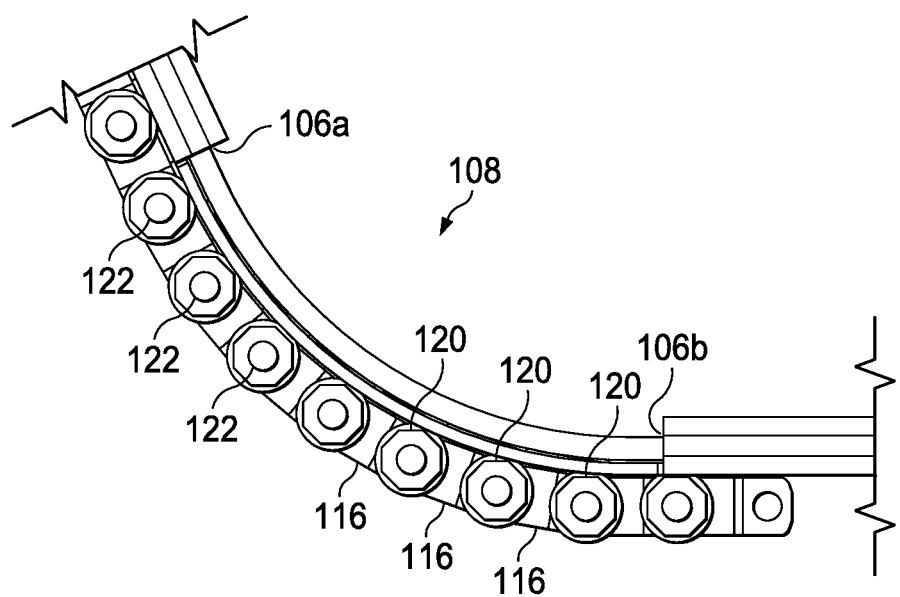
FIG. 9 is a simplified schematic diagram illustrating a plan view of an embodiment of a portion of a flexible display structure, in accordance with one embodiment of the present disclosure.

Turning to FIG. 9, FIG. 9 is a simplified plan view illustrating an embodiment of a portion of flexible display 102 in accordance with one embodiment of the present disclosure. As illustrated in FIG. 9, curve support 112*a* can allow for support of curved area 108. The structure and profile of each vertebrae 116 can allow for a relatively smooth bend that will not damage flexible display 102.

Figure 10A:
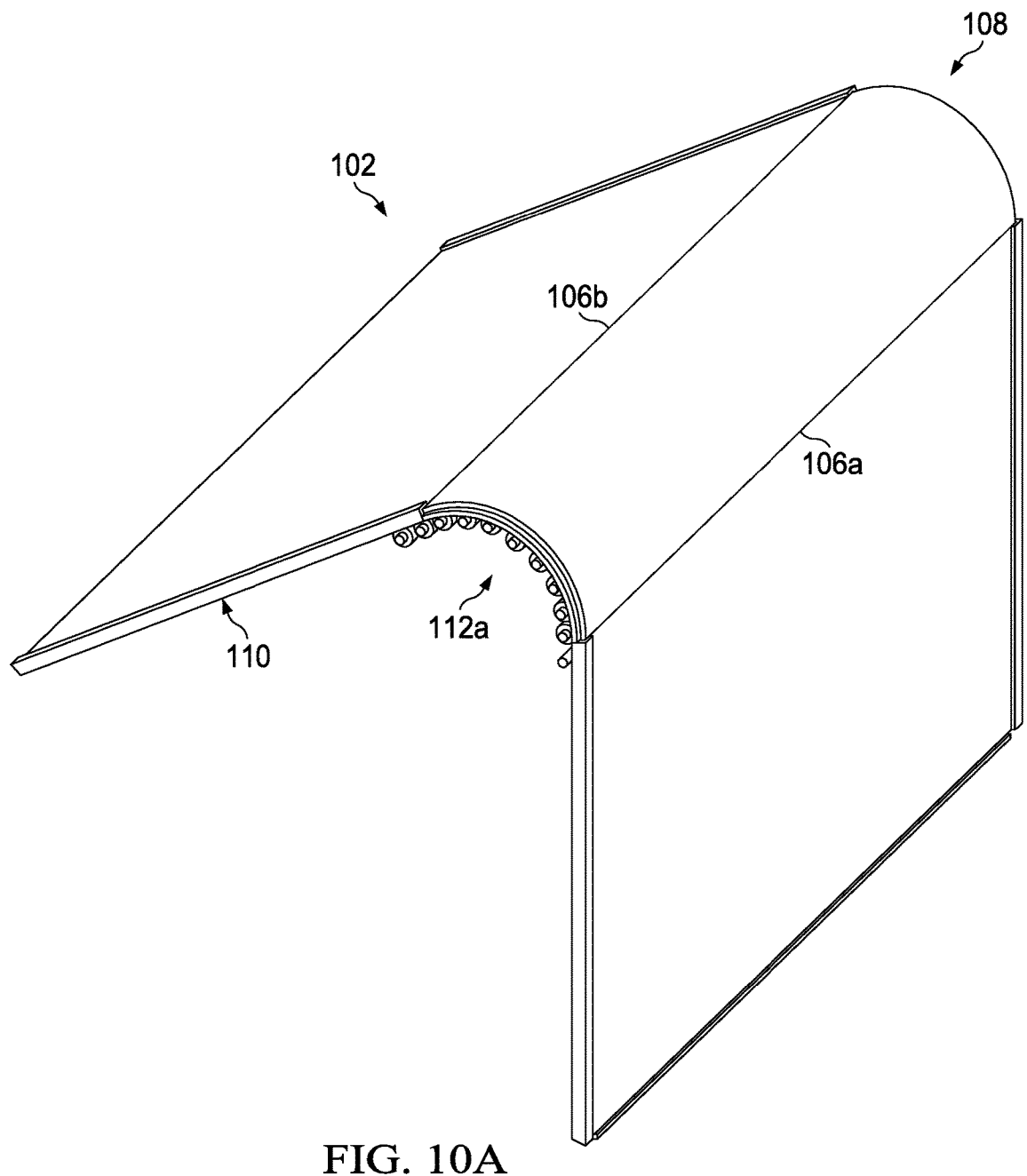
FIG. 10A is a simplified schematic diagram illustrating a plan view of an embodiment of a flexible display structure, in accordance with one embodiment of the present disclosure.

Turning to FIG. 10A, FIG. 10A is a simplified plan view illustrating an embodiment of flexible display 102 in accordance with one embodiment of the present disclosure. As illustrated in FIG. 10A, curve support 112*a* can allow for support of curved area 108 both backwards and forwards up to about one hundred and eighty degrees. The structure and profile of each vertebrae 116 in curve support 112*a* can allow for a relatively smooth bend both backwards and forwards that will not damage flexible display 102.

Figure 10B:
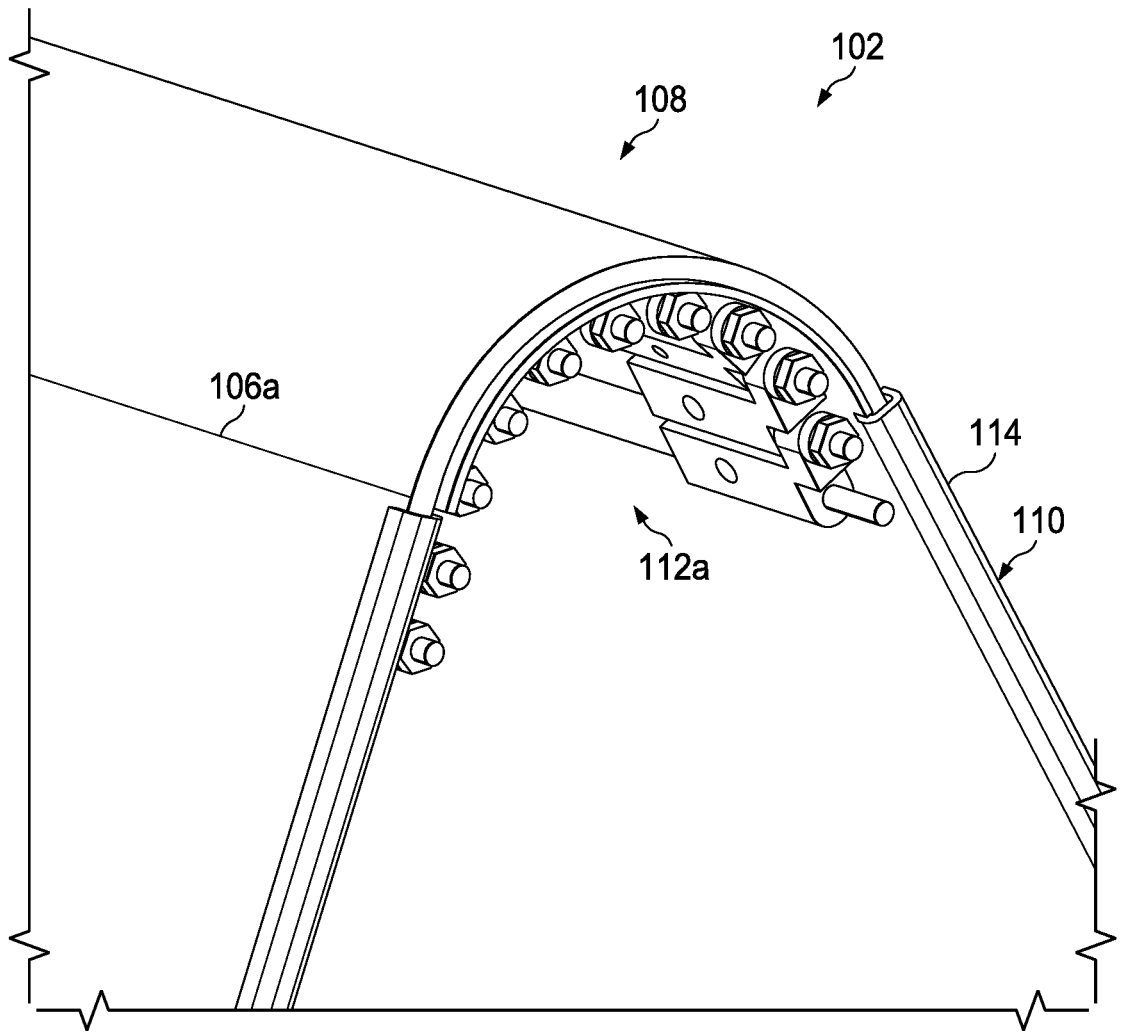
FIG. 10B is a simplified schematic diagram illustrating a plan view of an embodiment of a flexible display structure, in accordance with one embodiment of the present disclosure.

Turning to FIG. 10B, FIG. 10B is a simplified plan view illustrating an embodiment of flexible display 102 in accordance with one embodiment of the present disclosure. As illustrated in FIG. 10B, curve support 112*a* can allow for support of curved area 108. Flanges 114 on main support structure 110 can help hold flexible display 102 in place while flexible display 102 is bent or bending. The structure of main support structure 110 and curve support 112*a* can allow for a relatively smooth bend that will not damage flexible display 102.

Figure 11A:
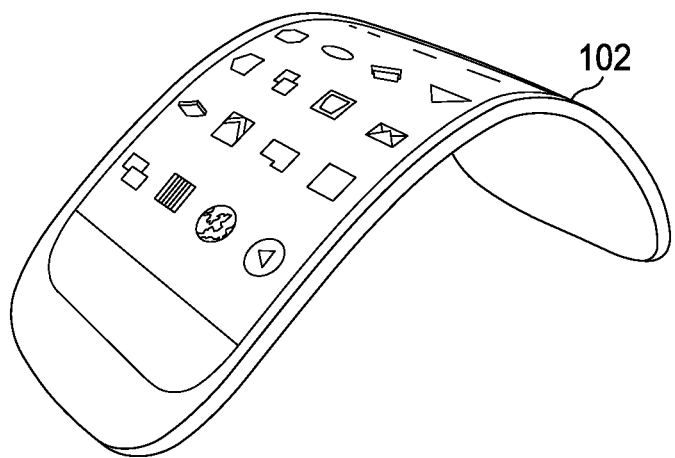
FIG. 11A is a simplified schematic diagram illustrating an orthographic view of an embodiment of an electronic device with a flexible display structure, in accordance with one embodiment of the present disclosure.
Figure 11B:
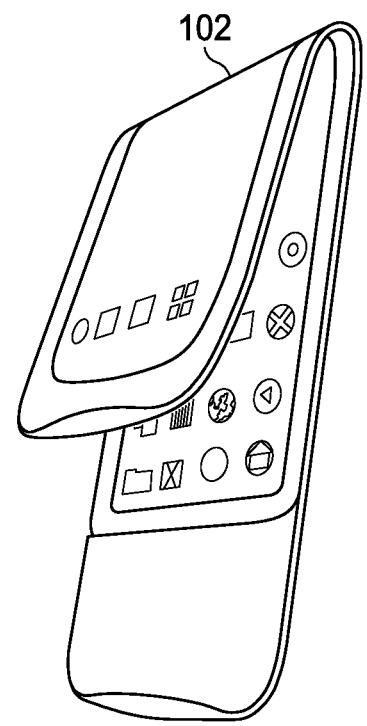
FIG. 11B is a simplified schematic diagram illustrating an orthographic view of an embodiment of an electronic device with a flexible display structure, in accordance with one embodiment of the present disclosure.
Figure 11C:
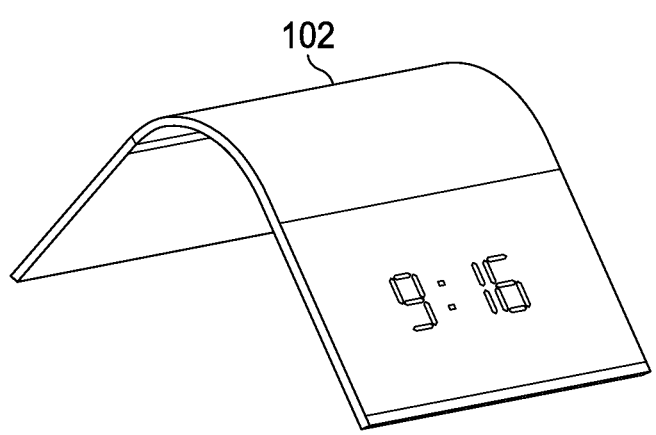
FIG. 11C is a simplified schematic diagram illustrating an orthographic view of an embodiment of an electronic device with a flexible display structure, in accordance with one embodiment of the present disclosure.

Turning to FIGS. 11A-11B, FIGS. 11A-11B are a simplified orthographic views illustrating embodiments of flexible display 102 in accordance with one embodiment of the present disclosure. As illustrated in FIGS. 11A and 11B, main support structure 110 and curve support 112*a* (not shown) can allow flexible display 102 can be bent or curved both backwards and forwards up to about one hundred and eighty degrees. In additional, flexible display 102 can be a display for a smartphone (as illustrated in FIG. 11A), a two sided display (as illustrated in FIG. 11B), a display for an electronic device such as a clock or clock radio (as illustrated in FIG. 11C), or a display for any other electronic device that has a curved display.

Figure 12A:
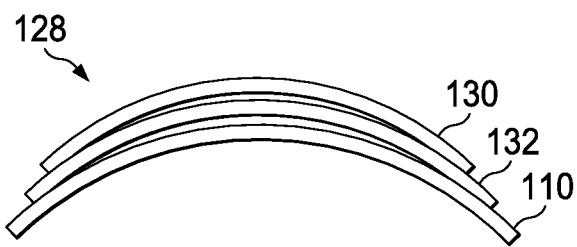
FIG. 12A is a simplified schematic diagram illustrating an plan view of an embodiment of a flexible display structure, in accordance with one embodiment of the present disclosure.
Figure 12B:
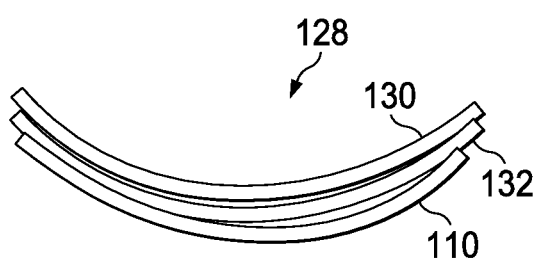
FIG. 12B is a simplified schematic diagram illustrating an plan view of a portion of an embodiment of a flexible display structure, in accordance with one embodiment of the present disclosure.

Turning to FIGS. 12A and 12B, FIGS. 12A and 12B are a simplified plan view illustrating an embodiment of a plate array 128 in accordance with one embodiment of the present disclosure. Plate array 128 can include main support structure 110, laminate 130 and a plurality of individual plates 132. Laminate 130 can help secure plurality of individual plates 132 to main support structure 110. Plate array 128 can be used to provide support for flexible display 102. In general, sliding parallel plates can allow a flexible structure while friction between the plates allows the plates to hold a desired deformed position.

Figure 13:
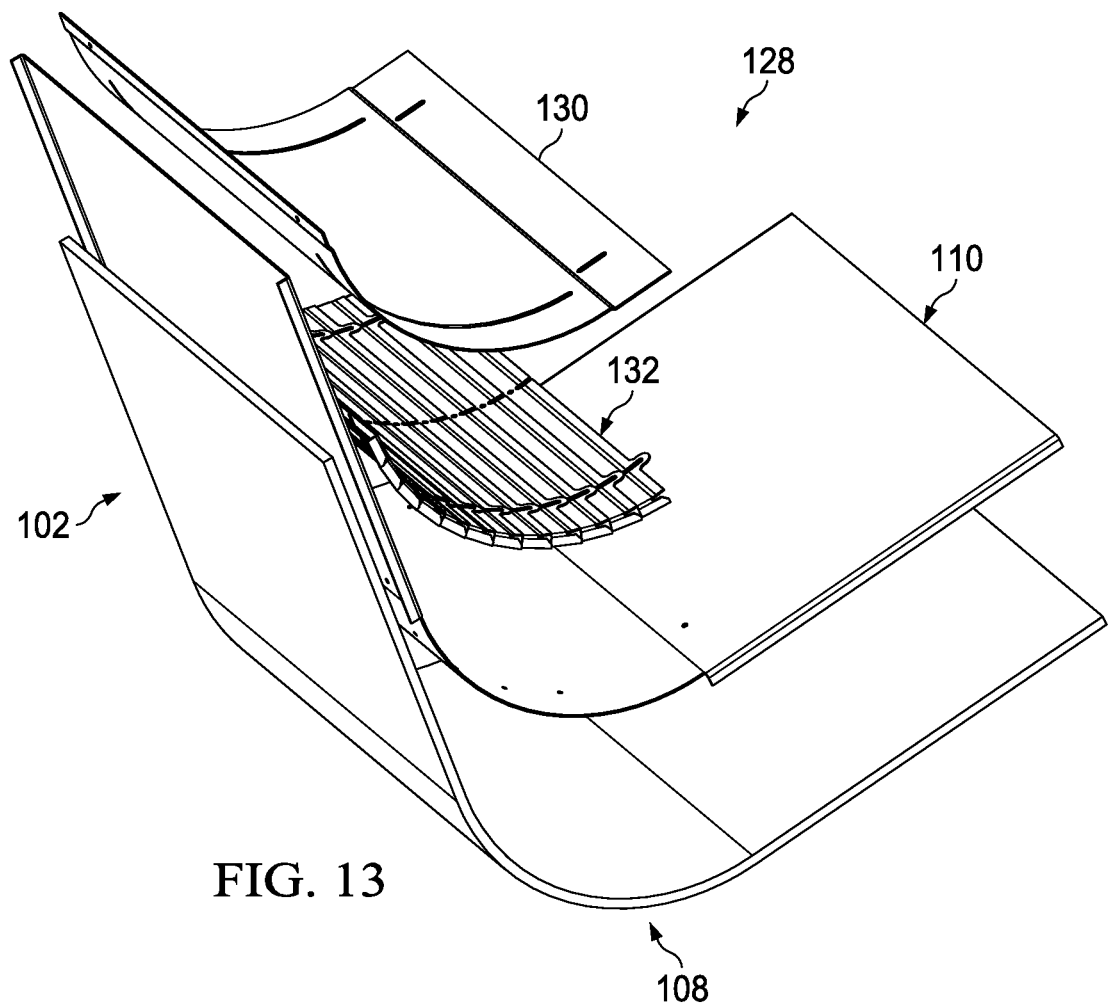
FIG. 13 is a simplified schematic diagram illustrating a plan exploded view of a flexible display structure, in accordance with one example implementation.

Turning to FIG. 13, FIG. 13 is a simplified exploded plan view illustrating an embodiment of plate array 128 in accordance with one embodiment of the present disclosure. Plate array 128 can be configured to allow for a relatively smooth bend that will not damage flexible display 102. As illustrated in FIGS. 12A and 12B, the bending can be both backwards and forwards up to about one hundred and eighty degrees.

Figure 14:
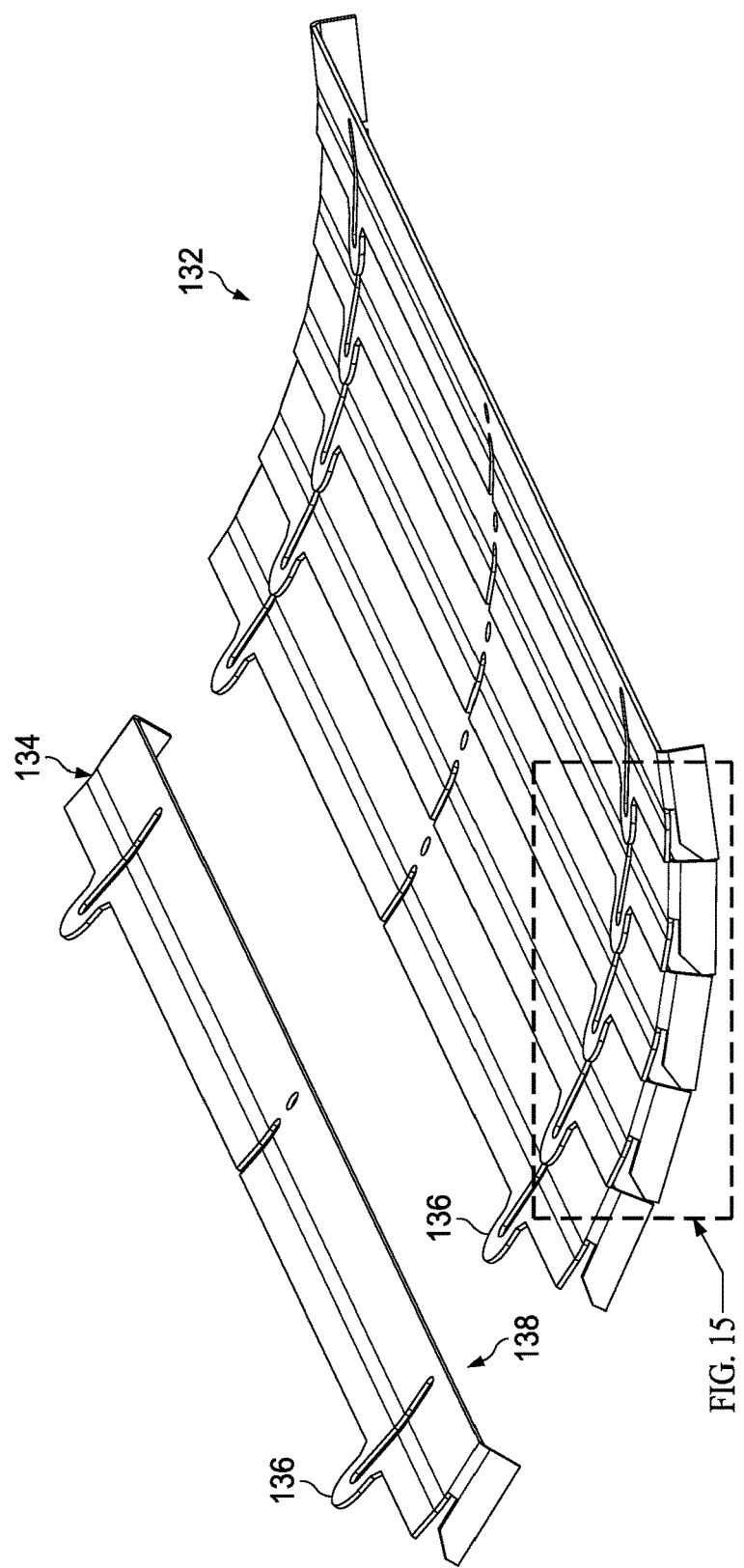
FIG. 14 is a simplified schematic diagram illustrating a plan view of an embodiment of a portion of a flexible display structure, in accordance with one embodiment of the present disclosure.
Figure 15:
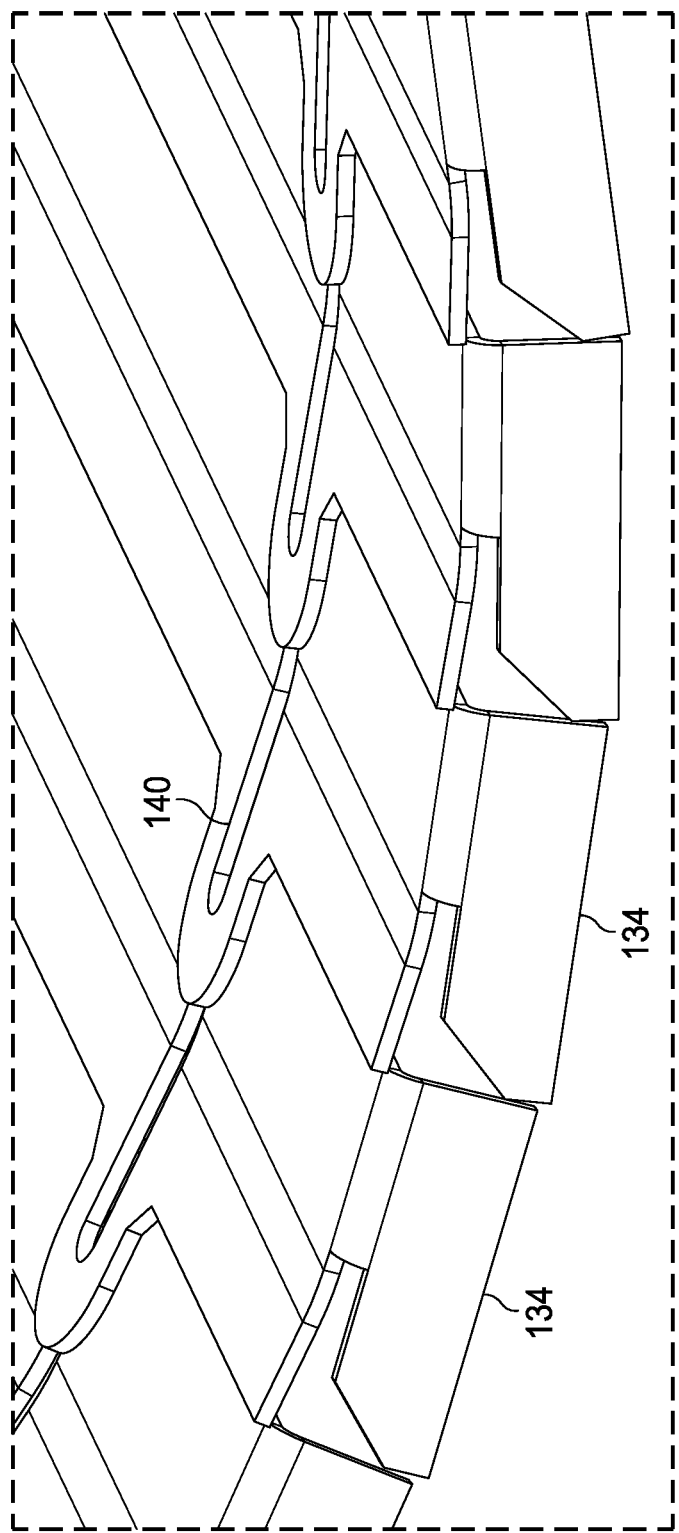
FIG. 15 is a simplified schematic diagram illustrating a plan view of an embodiment of a portion of a flexible display structure, in accordance with one embodiment of the present disclosure.

Turning to FIGS. 14 and 15, FIGS. 14 and 15 are a simplified plan view illustrating an embodiment of plurality of individual plates 132 in accordance with one embodiment of the present disclosure. Plurality of individual plates 132 can include plates 134. Each plate 134 can include a male fastener 136 and a coupling male fastener receptacle 138. Multiple plates 124 can be coupled to each other to form plurality of individual plates 132. In an example, coupling male fastener receptacle 138 may be a slot 140, as illustrated in FIG. 15, that can accommodate a portion of male fastener 136 on plate 134. Slot 140 can allow plate 134 to move or flex as flexible display 102 is bent or curved.

Figure 16:
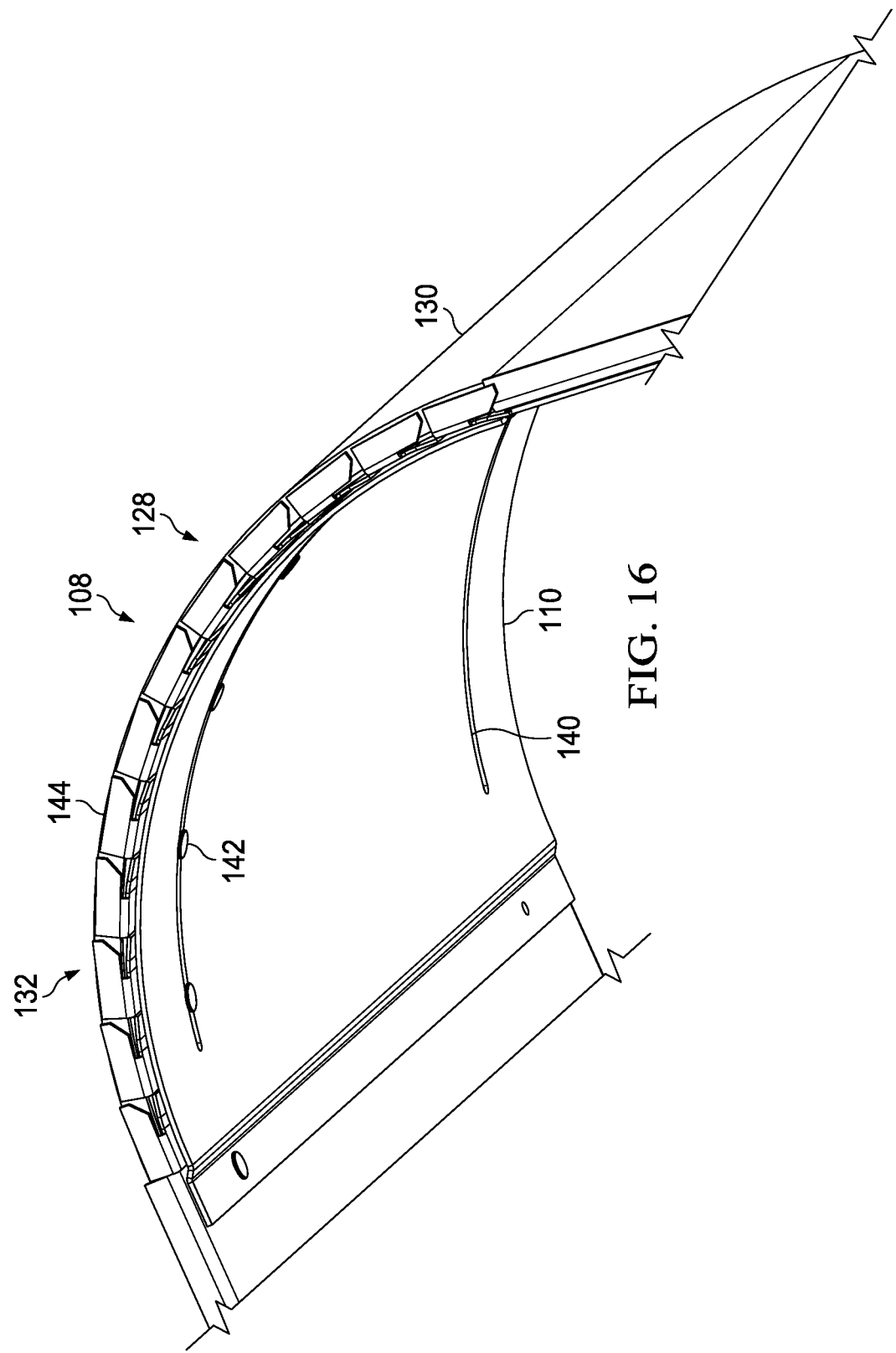
FIG. 16 is a simplified schematic diagram illustrating a plan view of an embodiment of a flexible display structure, in accordance with one embodiment of the present disclosure.

Turning to FIG. 16, FIG. 16 is a simplified plan view illustrating an embodiment of plate array 128 in accordance with one embodiment of the present disclosure. As illustrated in FIG. 16, laminate 130 can be secured to plurality of individual plates 132 to main support structure 110 using securing fasteners 142. Main support structure 110 can include securing fastener channel 118 to allow securing fasteners 142 some movement when main support structure 110 (and flexible display 102) is curved or bent.

Figure 17A:
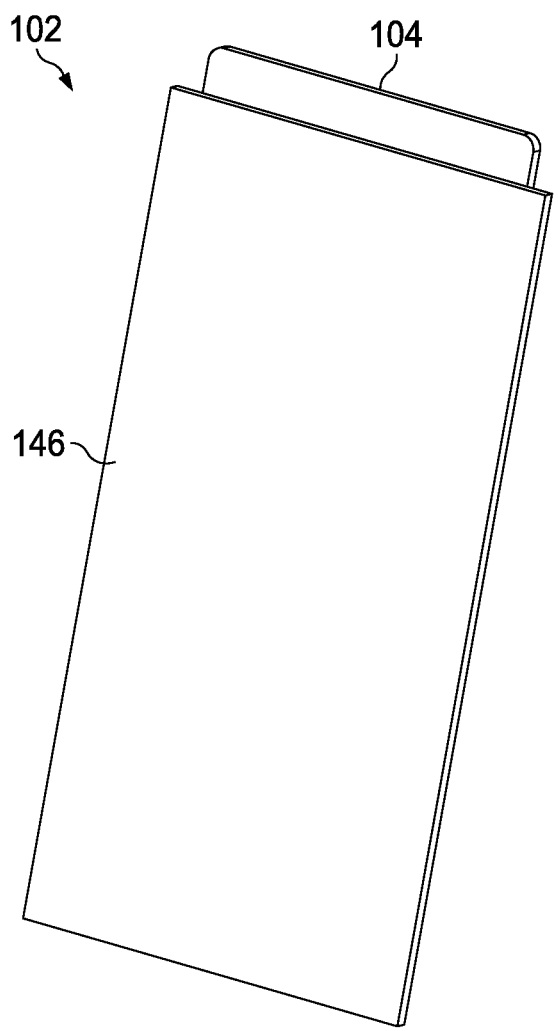
FIG. 17A is a simplified schematic diagram illustrating a plan view of an embodiment of an electronic device with a flexible display structure, in accordance with one embodiment of the present disclosure.

Turning to FIG. 17A, FIG. 17A is a simplified plan view illustrating an embodiment of flexible display 102 in accordance with one embodiment of the present disclosure. Flexible display 102 can include a center display portion 146. In this configuration, flexible display 102 has a profile similar to a smartphone.

Figure 17B:
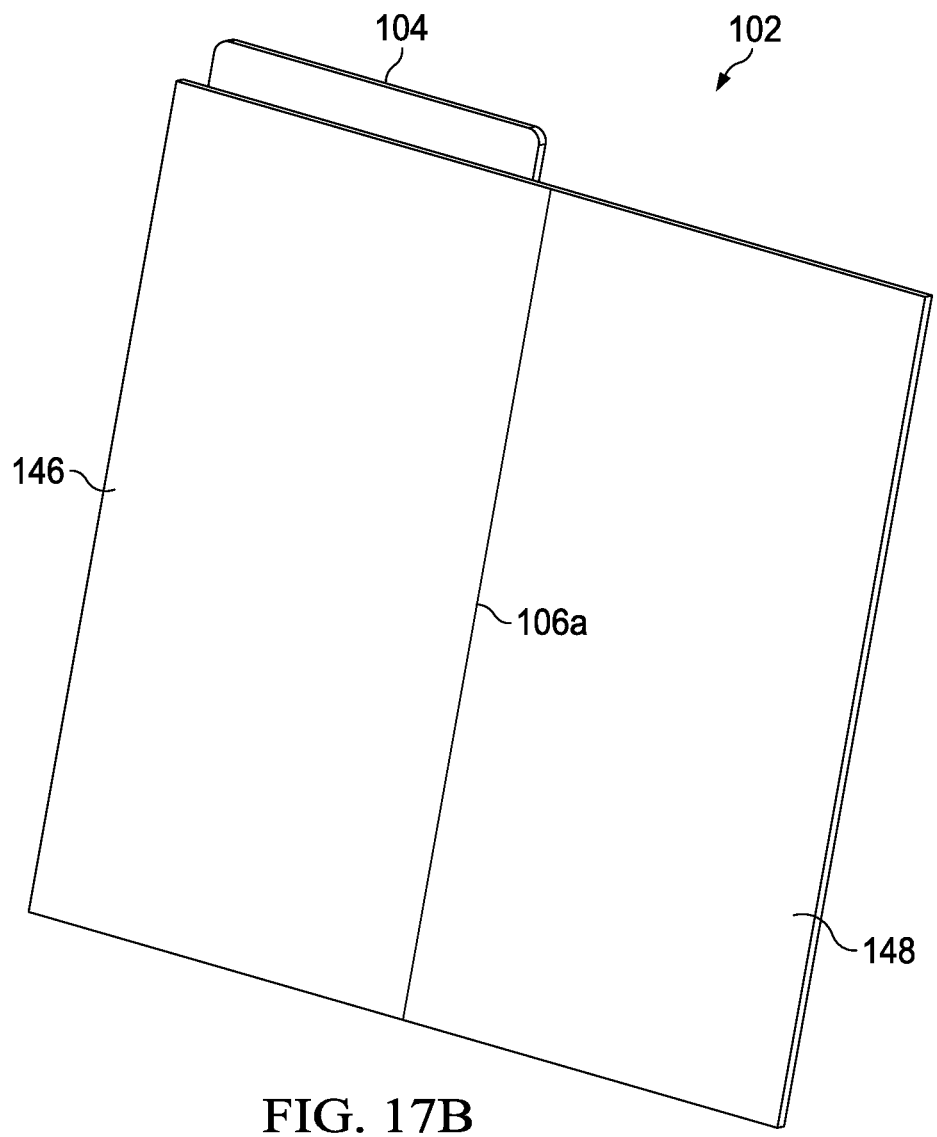
FIG. 17B is a simplified schematic diagram illustrating a plan view of an embodiment of an electronic device with a flexible display structure, in accordance with one embodiment of the present disclosure.

Turning to FIG. 17B, FIG. 17B is a simplified plan view illustrating an embodiment of flexible display 102 in accordance with one embodiment of the present disclosure. Flexible display 102 can include center display portion 146 and a first side display portion 148. First side display portion 148 can be configured to wrap around first housing 104 to create the configuration illustrated in FIG. 17A. In this configuration, flexible display 102 has a profile similar to a tablet.

Figure 17C:
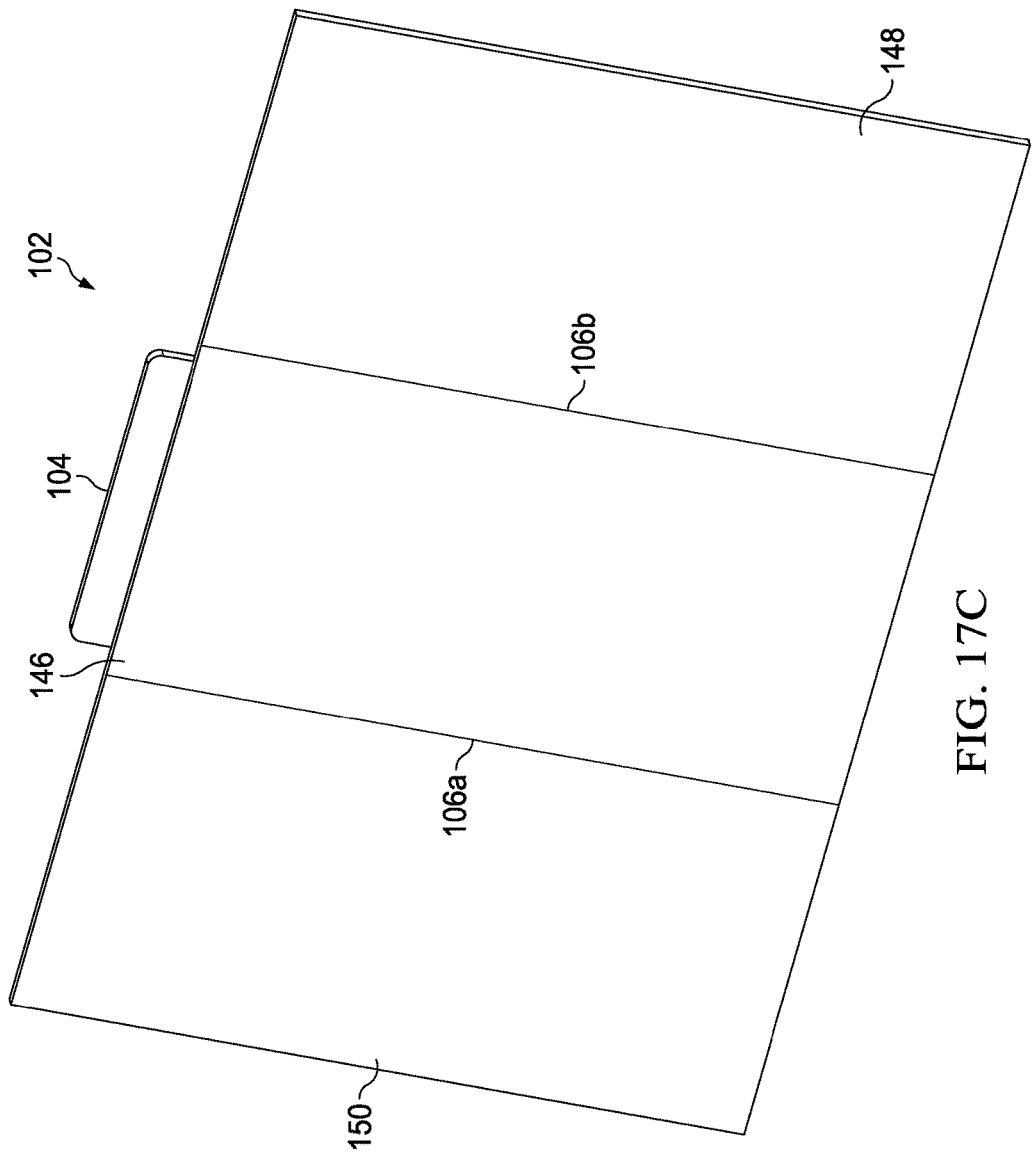
FIG. 17C is a simplified schematic diagram illustrating a plan view of an embodiment of an electronic device with a flexible display structure, in accordance with one embodiment of the present disclosure.

Turning to FIG. 17C, FIG. 17C is a simplified plan view illustrating an embodiment of flexible display 102 in accordance with one embodiment of the present disclosure. Flexible display 102 can include center display portion 146, first side display portion 148, and a second side display portion 150. Second side display portion 150 can be configured to wrap around first housing 104 to create the configuration illustrated in FIGS. 17A and 17B. In this configuration, flexible display 102 has a profile similar to a large tablet or laptop computer.

Figure 18:
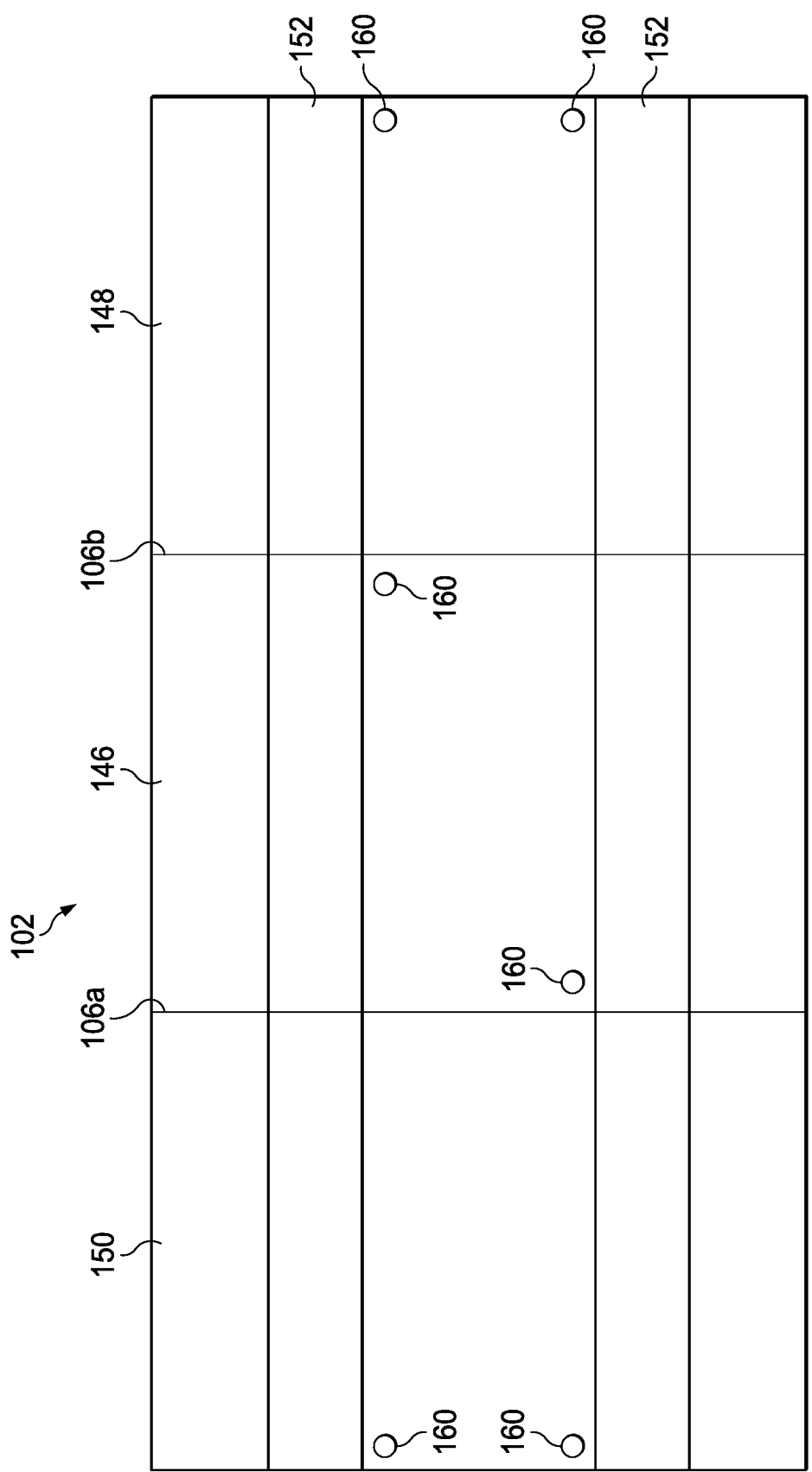
FIG. 18 is a simplified schematic diagram illustrating a plan view of an embodiment of an electronic device with a flexible display structure, in accordance with one embodiment of the present disclosure.

Turning to FIG. 18, FIG. 18 is a simplified plan view illustrating an embodiment of flexible display 102 in accordance with one embodiment of the present disclosure. Flexible display 102 can include curve creases 106*a* and 106*b* and magnets 160. In addition, flexible display 102 may be supported by one or more bi-stable steel supports 152.

Using bi-stable steel supports 152 as a horizontal hinge for first side display 148 and second side display 150 can allow a user to relatively easily expand the screen from folded as illustrated in FIG. 17A and to flat single screen as illustrated in FIG. 7C. A characteristic of bi-stable steel supports 152 can be to positively lock into the full screen expanded profile and to provide a stable angle when closed. This can be accomplished by a various number of bi-stable steel supports 152 along a hinge axis and allows for a thinner and mechanically simpler solution than a friction or coaxial hinge.

Figure 19:
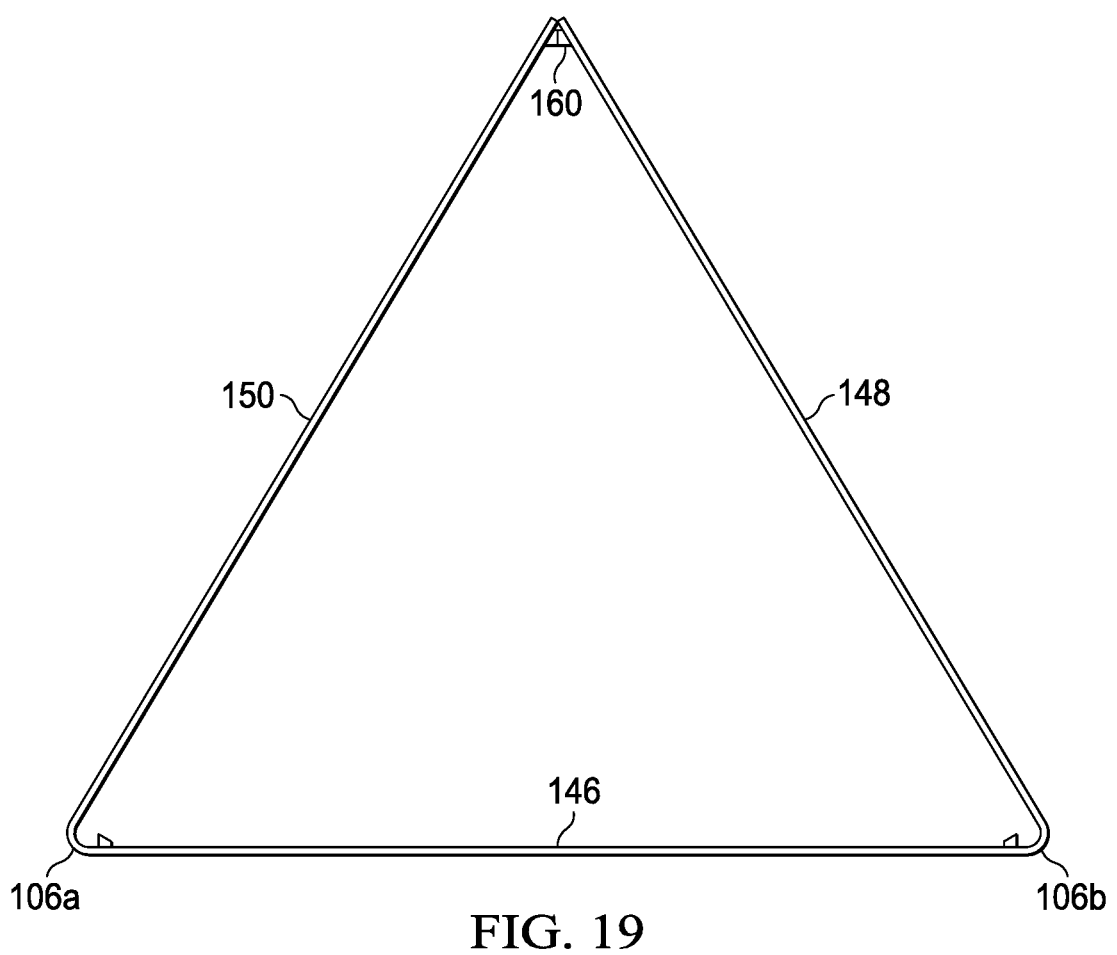
FIG. 19 is a simplified schematic diagram illustrating a plan view of an embodiment of an electrical device with a flexible display structure, in accordance with one embodiment of the present disclosure.

Turning to FIG. 19, FIG. 19 is a simplified plan view illustrating an embodiment of flexible display 102 in accordance with one embodiment of the present disclosure. Bi-stable steel supports 152 can be paired with magnetics 160 for a tri-fold and dual-fold use cases to keep the screen folded/closed in place without the need of mechanical latches. For example, using bi-stable steel supports 152, flexible display 102 can be configured to have a triangle shaped profile. Magnets 160 can help first side display 148 and second side display 150 couple together to hold the triangle shaped profile. Bi-stable steel supports 152 are thinner comparatively to the friction hinge that would be required for rotating and locking into a single screen format.

Figure 20:
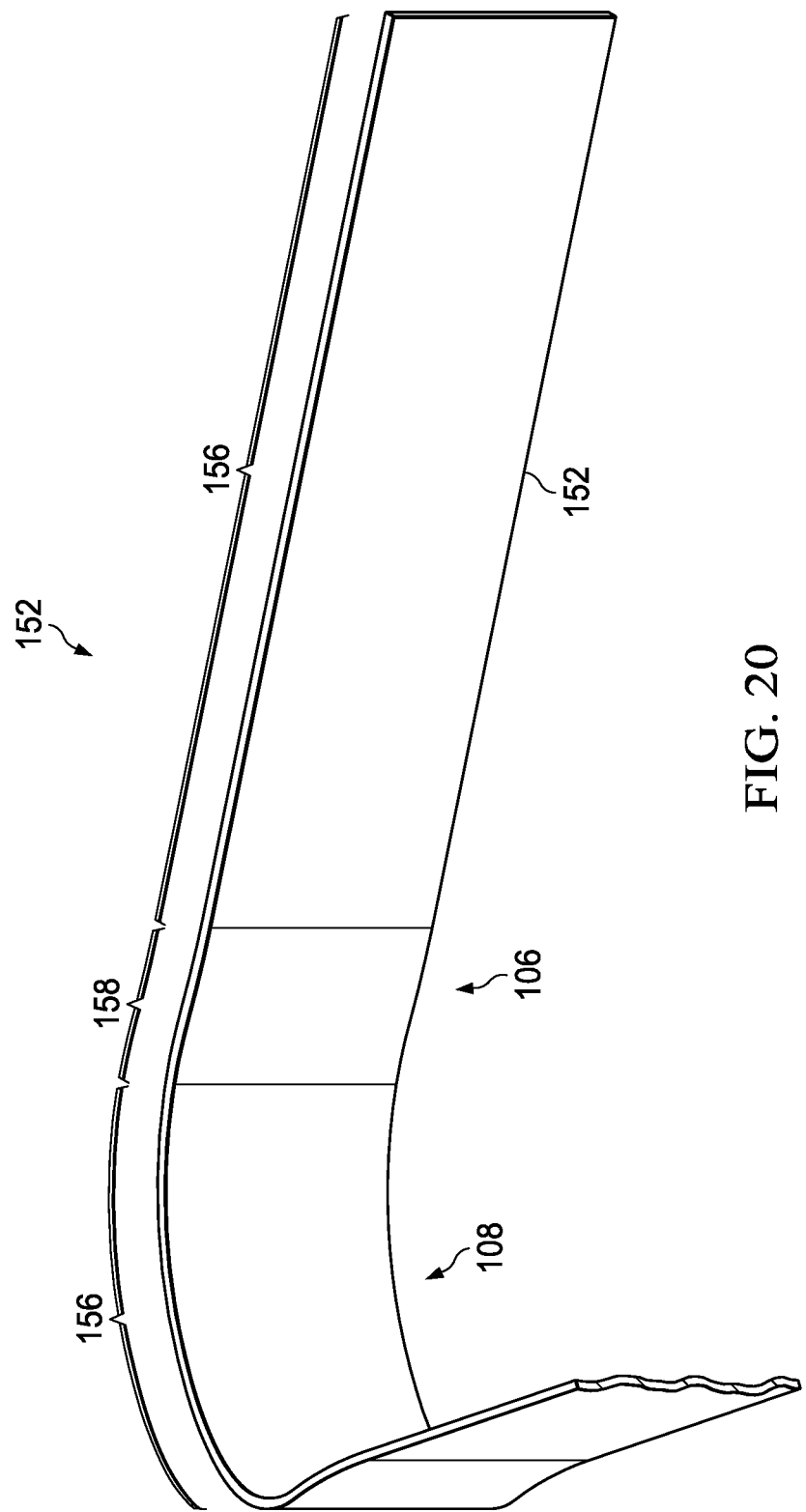
FIG. 20 is a simplified schematic diagram illustrating a plan view of an embodiment of a portion of a flexible display structure, in accordance with one embodiment of the present disclosure.

Turning to FIG. 20, FIG. 20 is a simplified plan view illustrating an embodiment of one bi-stable steel support 152 in accordance with one embodiment of the present disclosure. Bi-stable steel support 152 can include low stress regions 156 and at least one high stress region 158. For example, the areas around curve crease 106 could include high stress region 158 and curved area 108 could include low stress region 156 to allow for relative smooth bending of flexible display 102.

Figure 21A:
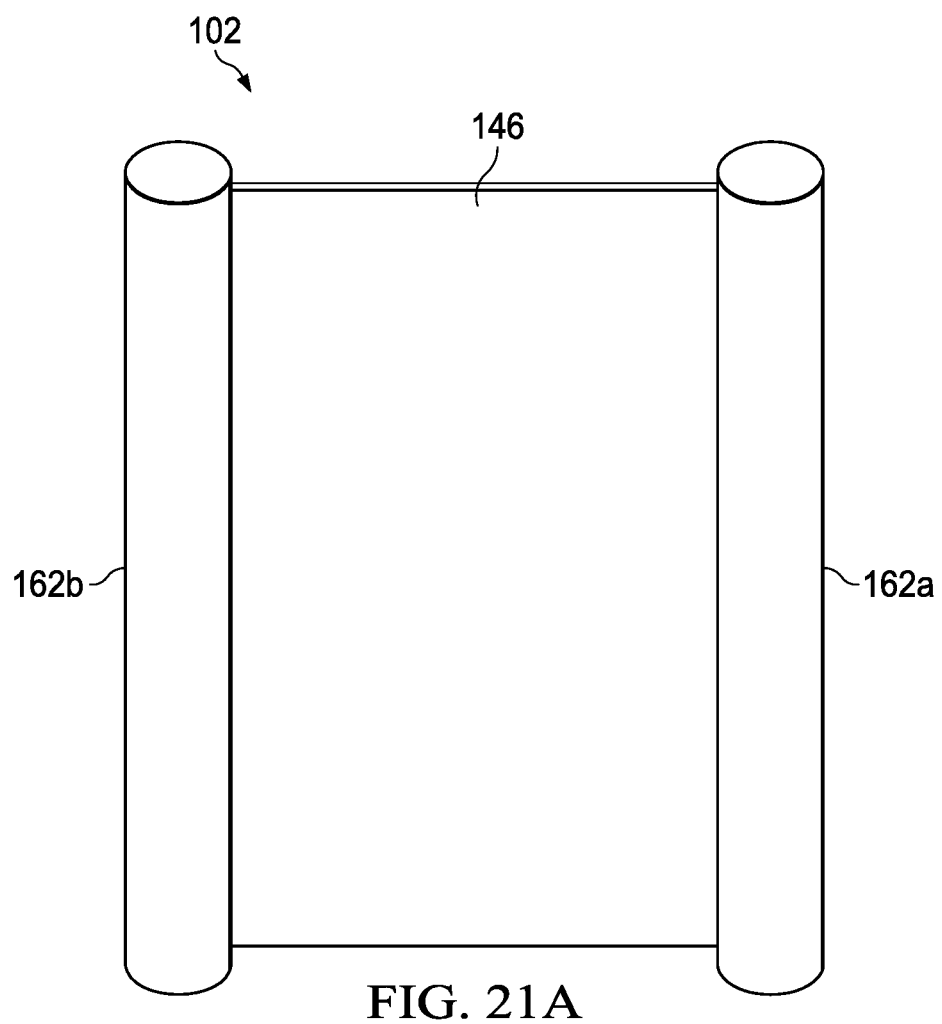
FIG. 21A is a simplified schematic diagram illustrating a plan view of an embodiment of an electrical device with a flexible display structure, in accordance with one embodiment of the present disclosure.

Turning to FIG. 21A, FIG. 21A is a simplified plan view illustrating an embodiment of flexible display 102 in accordance with one embodiment of the present disclosure. In an example, first side display portion 148 may be stored or housed in a storage tube 162*a* and second side display portion 150 may be stored or housed in a storage tube 162*b*. Storage tube 162*a* and/or 162*b* can also house electronics to allow center display portion 146 to function as a touch display.

Figure 21B:
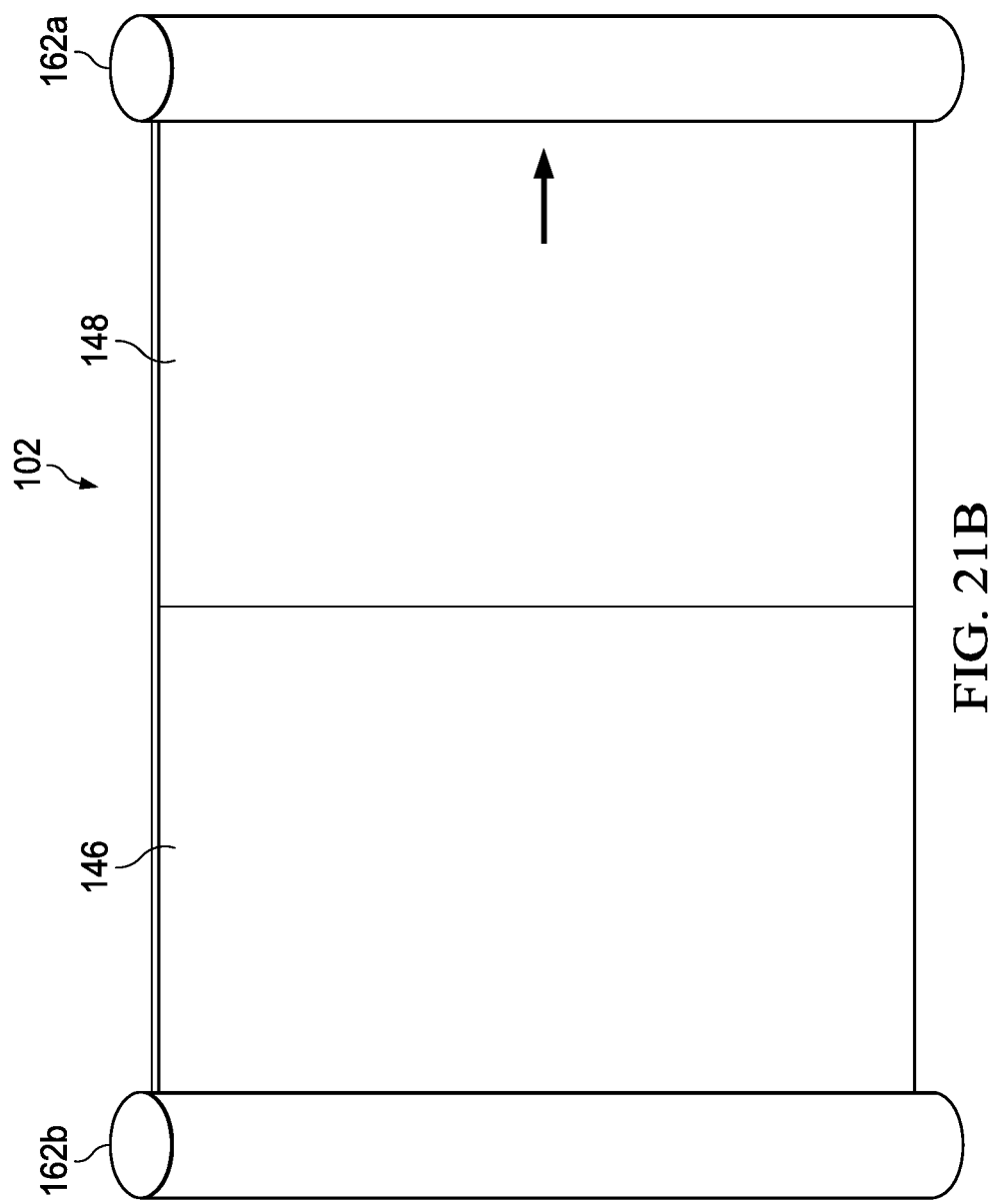
FIG. 21B is a simplified schematic diagram illustrating a plan view of an embodiment of an electrical device with a flexible display structure, in accordance with one embodiment of the present disclosure.

Turning to FIG. 21B, FIG. 21B is a simplified plan view illustrating an embodiment of flexible display 102 in accordance with one embodiment of the present disclosure. In an example, to reveal first side display portion 148, a storage tube 162*a* housing first side display portion 148 can be moved away from center display portion 146. Storage tube 162*a* can be configured to allow first side display portion 148 to unroll such that flexible display 102 is in a tablet configuration.

Figure 21C:
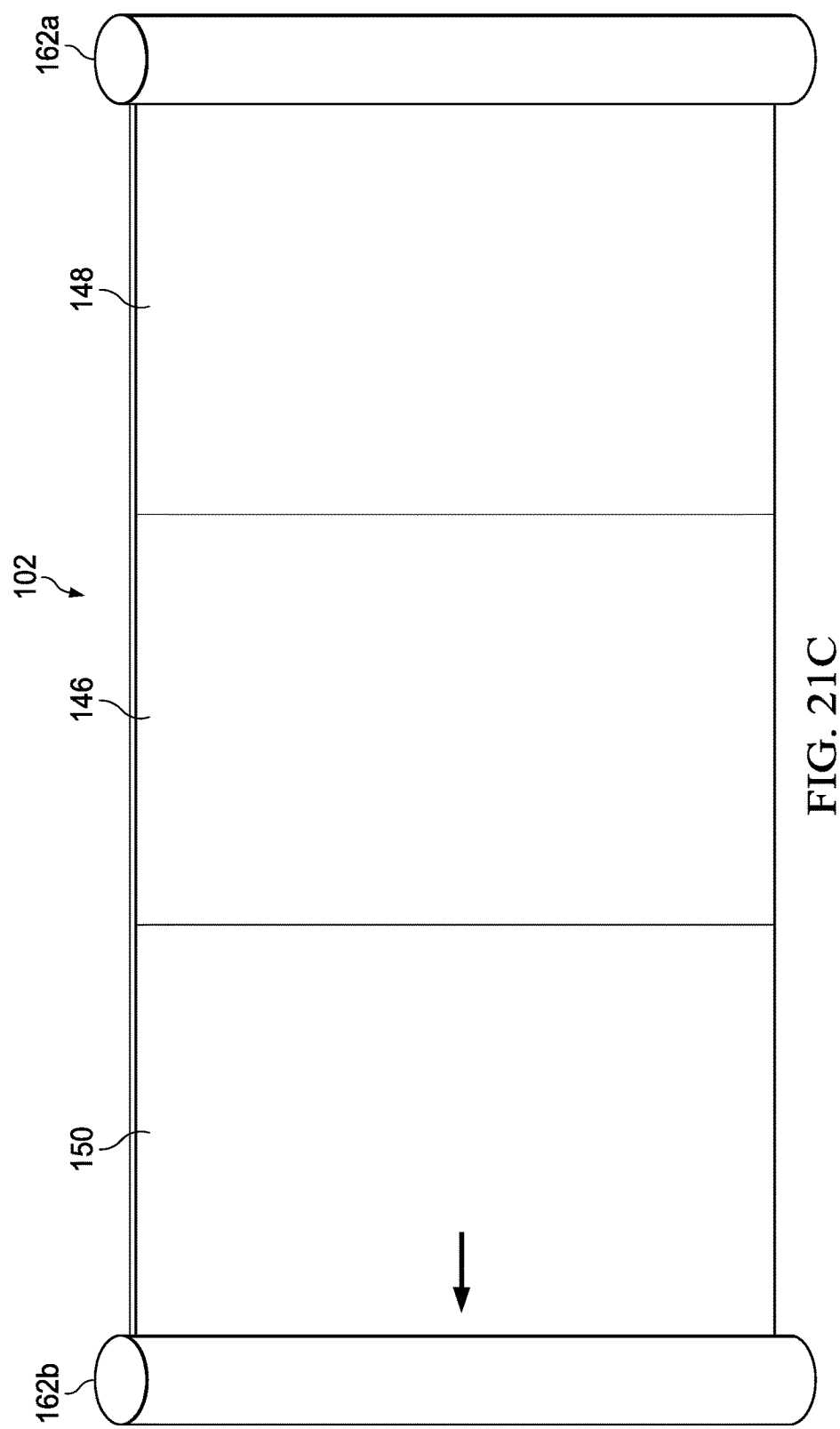
FIG. 21C is a simplified schematic diagram illustrating a plan view of an embodiment of an electrical device with a flexible display structure, in accordance with one embodiment of the present disclosure.

Turning to FIG. 21C, FIG. 21C is a simplified plan view illustrating an embodiment of flexible display 102 in accordance with one embodiment of the present disclosure. In an example, to reveal second side display portion 148, a storage tube 162b housing second side display portion 148 can be moved away from center display portion 146. Storage tube 162b can be configured to allow first side display portion 148 to unroll such that flexible display 102 is in a full size screen or large tablet configuration.

Figure 22:
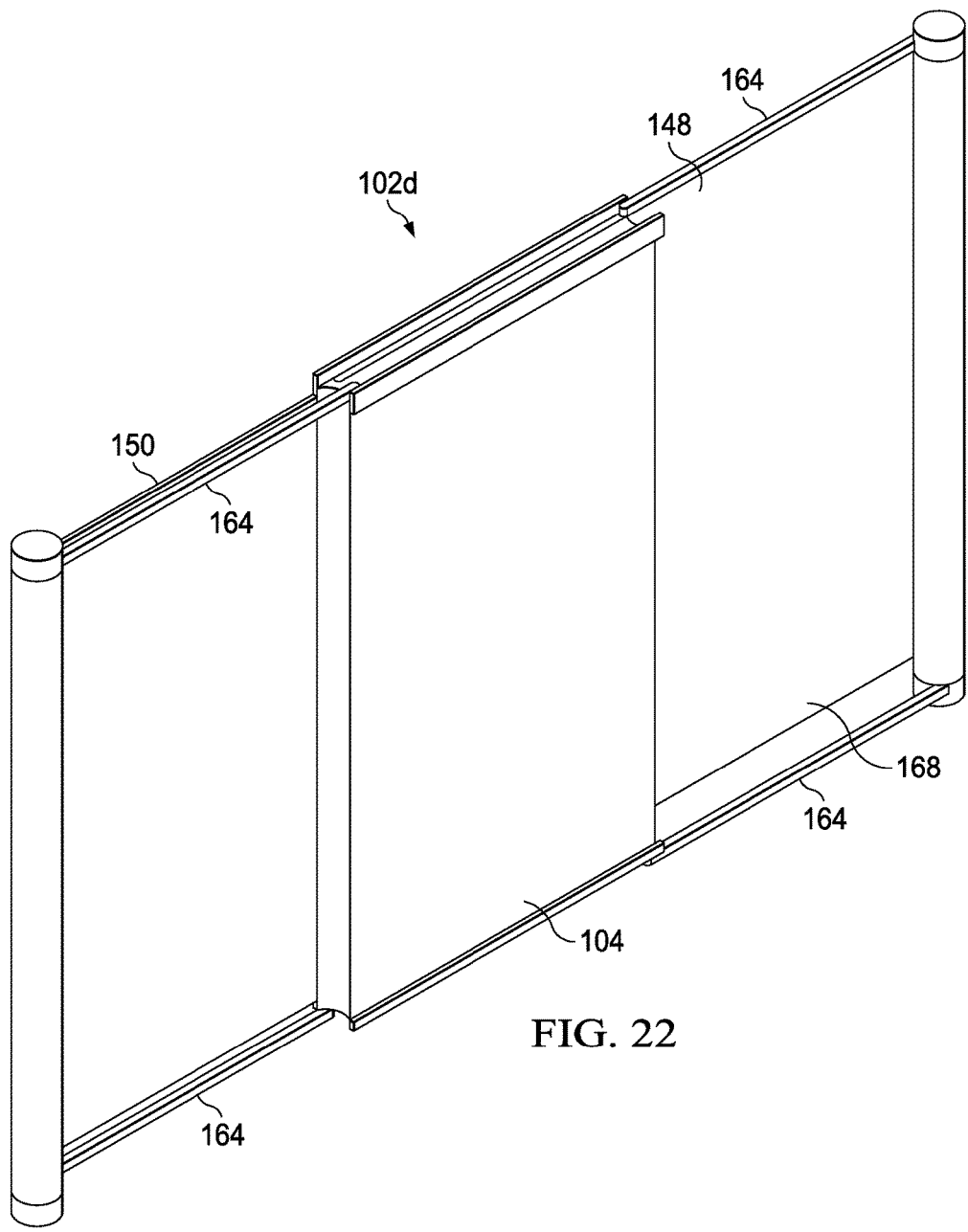
FIG. 22 is a simplified schematic diagram illustrating a plan view of an embodiment of an electrical device with a flexible display structure, in accordance with one embodiment of the present disclosure.

Turning to FIG. 22, FIG. 22 is a simplified plan view illustrating an embodiment of flexible display 102 in accordance with one embodiment of the present disclosure. One or more support rails 164 can help support flexible display 102 when flexible display is a full size screen profile (e.g., as illustrated in FIG. 21C). When not in use, support rails can be stored on a track or channel of first housing 104.

Figure 23A:
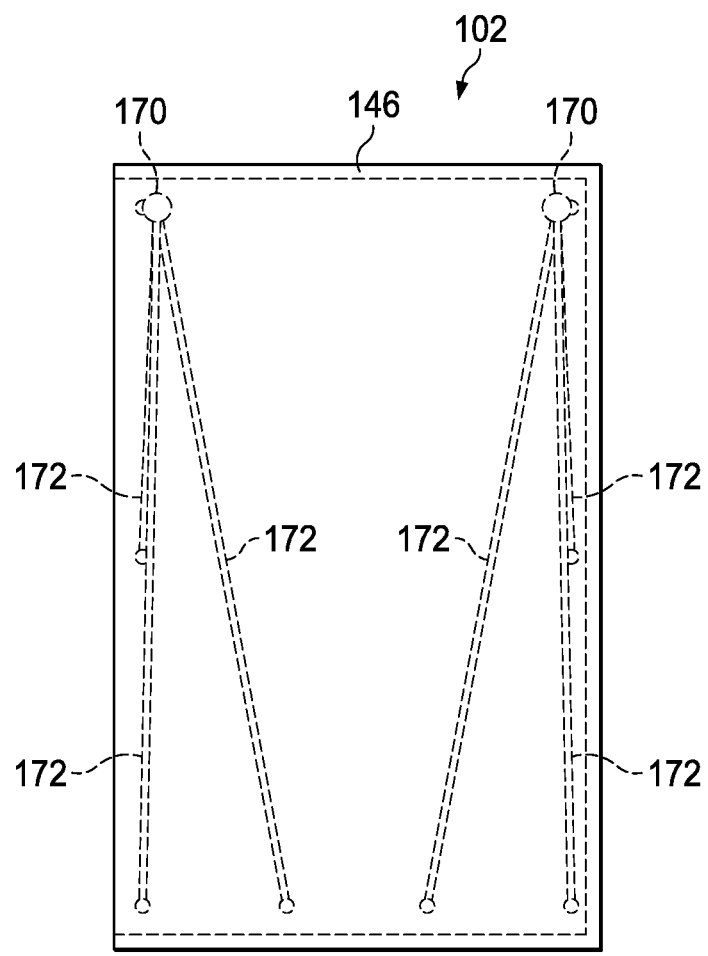
FIG. 23A is a simplified schematic diagram illustrating a plan view of an embodiment of an electrical device with a flexible display structure, in accordance with one embodiment of the present disclosure.

Turning to FIG. 23A, FIG. 23A is a simplified plan view illustrating an embodiment of flexible display 102 in accordance with one embodiment of the present disclosure. Flexible display 102 can include pivot points 170 and support ribs 172. In a closed configuration, support ribs 172 can be stored in a discreet manner.

Figure 23B:
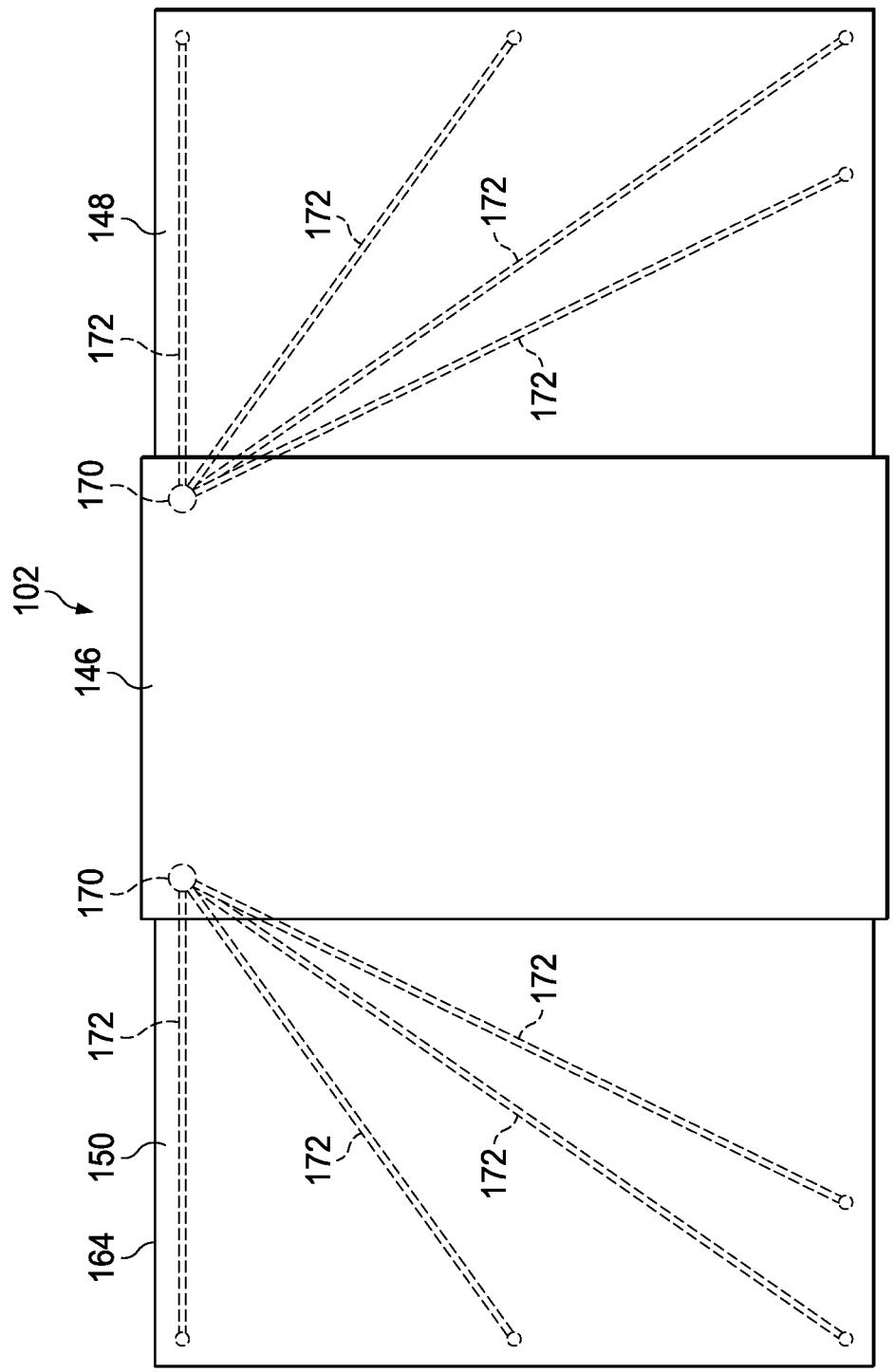
FIG. 23B is a simplified schematic diagram illustrating a plan view of an embodiment of an electrical device with a flexible display structure, in accordance with one embodiment of the present disclosure.

Turning to FIG. 23B, FIG. 23B is a simplified plan view illustrating an embodiment of flexible display 102 in accordance with one embodiment of the present disclosure. When first side display portion 148 is extended away from center display portion 146, support ribs 172 can pivot on pivot point 170 and fan out like a fan to support first side display portion 148. Similarly, when second side display portion 150 is extended away from center display portion 146, support ribs 172 can pivot on pivot point 170 and fan out like a fan to support first side display portion 150.

Figure 24A:
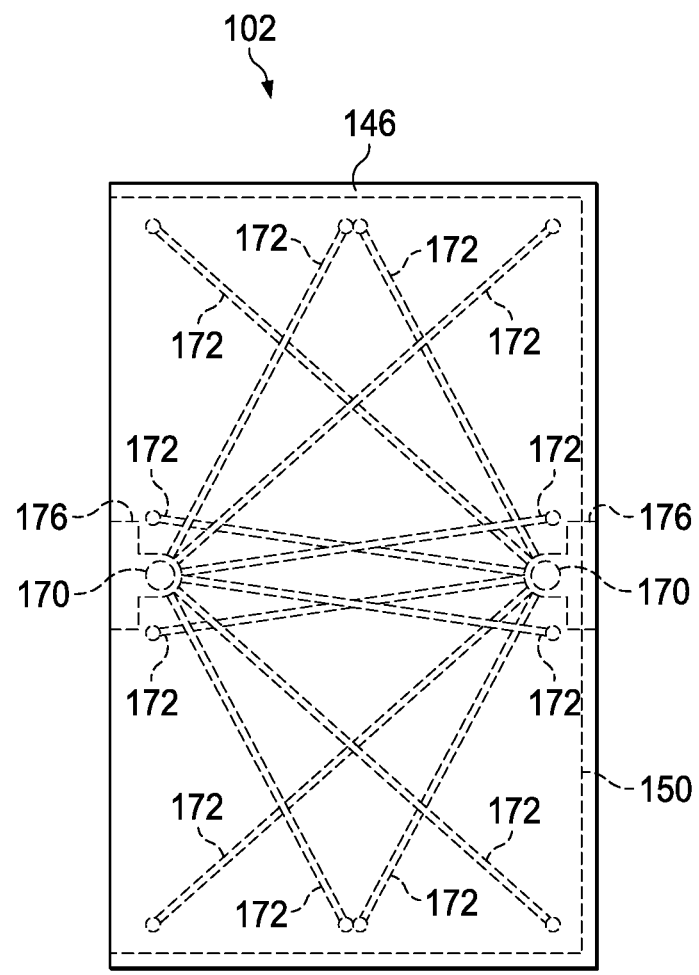
FIG. 24A is a simplified schematic diagram illustrating a plan view of an embodiment of an electrical device with a flexible display structure, in accordance with one embodiment of the present disclosure.

Turning to FIG. 24A, FIG. 23A is a simplified plan view illustrating an embodiment of flexible display 102 in accordance with one embodiment of the present disclosure. Flexible display 102 can include pivot points 170, support ribs 172, and swivel 176. In a closed configuration, support ribs 172 can be stored in a discreet manner.

Figure 24B:
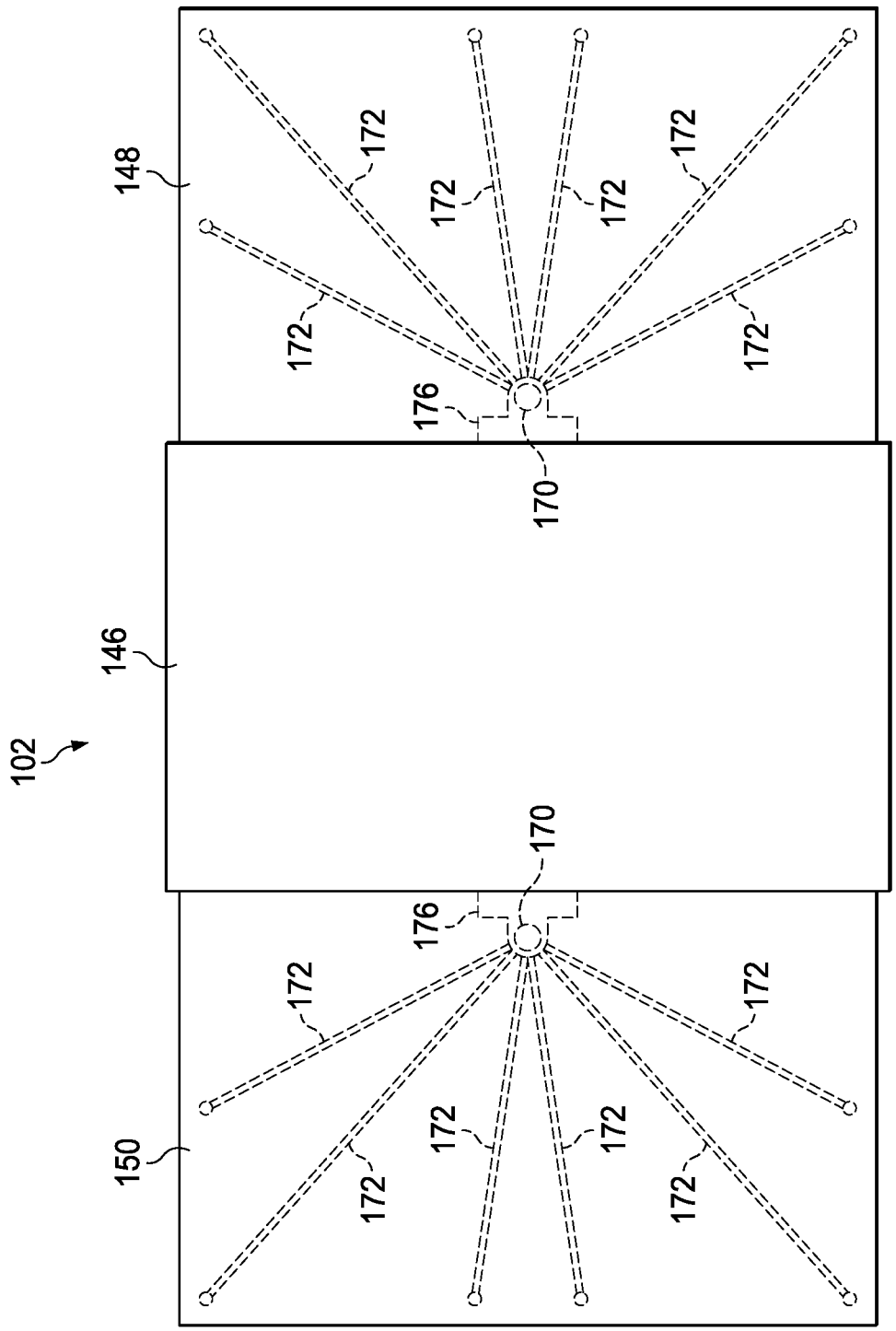
FIG. 24B is a simplified schematic diagram illustrating a plan view of an embodiment of an electrical device with a flexible display structure, in accordance with one embodiment of the present disclosure.

Turning to FIG. 24B, FIG. 24B is a simplified plan view illustrating an embodiment of flexible display 102 in accordance with one embodiment of the present disclosure. When first side display portion 148 is extended away from center display portion 146, swivel 176 can rotate pivot point 170 such that support ribs 172 can pivot on pivot point 170 and fan out like a fan to support first side display portion 148. Similarly, when second side display portion 150 is extended away from center display portion 146, swivel 176 can rotate pivot point 170 such that support ribs 172 can pivot on pivot point 170 and fan out like a fan to support first side display portion 150.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the present disclosure has been illustrated with reference to particular elements and operations that facilitate the communication process, these elements and operations may be replaced by any suitable architecture, protocols, and/or processes that achieve the intended functionality of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example A1 is an electronic device that includes a flexible display and a support for the flexible display. The support includes a main support structure, at least one curve crease, and a curve region, wherein the curve region includes a curve support.

In Example A2, the subject matter of Example A1 may optionally include where the curve support includes a plurality of interlocked support members.

In Example A3, the subject matter of any of the preceding 'A' Examples can optionally include where the interlocked support members are vertebrae and each vertebrae includes a male interlocking feature and a female interlocking feature.

In Example A4, the subject matter of any of the preceding 'A' Examples can optionally include where the curve support is a plate array that includes a plurality of plates secured to the main support structure using a laminate.

In Example A5, the subject matter of any of the preceding 'A' Examples can optionally include where the main support structure includes a securing fastener channel and the curve support is coupled to the main support structure using securing fasteners coupled to the securing fastener channel.

In Example A6, the subject matter of any of the preceding 'A' Examples can optionally include where the curve support includes at least one bi-stable steel support.

In Example A7, the subject matter of any of the preceding 'A' Examples can optionally include where the main support structure includes flanges to couple the flexible display to the main support structure.

Example AA1 is a support for a flexible display, the support including a main support structure, at least one curve crease, and a curve region, where the curve region includes a curve support.

In Example AA2, the subject matter of any of the preceding 'M' Examples can optionally include where the curve support includes a plurality of interlocked support members.

In Example AA3, the subject matter of any of the preceding 'M' Examples can optionally include where the interlocked support members are vertebrae and each vertebrae includes a male interlocking feature and a female interlocking feature.

In Example AA4, the subject matter of any of the preceding 'M' Examples can optionally include where the curve support is a plate array that includes a plurality of plates secured to the main support structure using a laminate.

In Example AA5, the subject matter of any of the preceding 'M' Examples can optionally include where the main support structure includes a securing fastener channel and the curve support is coupled to the main support structure using securing fasteners coupled to the securing fastener channel.

In Example AA6, the subject matter of any of the preceding 'M' Examples can optionally include where the curve support includes at least one bi-stable steel support.

In Example AA7, the subject matter of any of the preceding 'M' Examples can optionally include where the main support structure includes flanges to couple the flexible display to the main support structure.

An example system S1 can include an electronic device and a flexible display. The flexible display can include a support for the flexible display. The support can includes a main support structure, at least one curve crease, and a curve region, where the curve region includes a curve support.

An example system S2 can include where the curve support includes a plurality of interlocked support members.

In Example S3, the subject matter of any of the preceding 'SS' Examples can optionally include where the interlocked support members are vertebrae and each vertebrae includes a male interlocking feature and a female interlocking feature.

In Example S4, the subject matter of any of the preceding 'SS' Examples can optionally include where the curve support is a plate array that includes a plurality of plates secured to the main support structure using a laminate.

In Example S5, the subject matter of any of the preceding 'SS' Examples can optionally include where the main support structure includes a securing fastener channel and the curve support is coupled to the main support structure using securing fasteners coupled to the securing fastener channel.

In Example S6, the subject matter of any of the preceding 'S' Examples can optionally include where the curve support includes at least one bi-stable steel support.

The invention claimed is:

1. An electronic device, comprising:
   a flexible display; and
   a support for the flexible display, wherein the support includes:
   a main support structure;
   at least one curve crease; and
   a curve region, wherein the curve region includes a curve support, wherein the curve support includes:
   individual vertebrae, wherein the individual vertebrae each include a first end and a second end and the individual vertebrae are interlocked at the first end and the second end, wherein a first individual vertebra and a second individual vertebra share a common axis of rotation, wherein the common axis of rotation includes a threaded rod on the first end of the first individual vertebra that passes through a snap slot on the first end of the second individual vertebra.

2. The electronic device of claim 1, wherein the first end and the second end of each of the individual vertebrae include a male interlocking feature and a female interlocking feature.

3. The electronic device of claim 1, wherein the main support structure includes a securing fastener channel and the curve support is coupled to the main support structure using securing fasteners coupled to the securing fastener channel.

4. The electronic device of claim 1, wherein the main support structure includes flanges to couple the flexible display to the main support structure.

5. The electronic device of claim 1, wherein the threaded rod is secured to the snap slot using a Belleville washer.

6. The electronic device of claim 5, wherein the Belleville washer produces a friction torque.

7. The electronic device of claim 1, wherein one or more of the individual vertebrae includes a cam surface that limits rotation.

8. The electronic device of claim 1, wherein the main support structure is a thin bi-stable steel stamped sheet.

9. The electronic device of claim 1, wherein the main support structure includes one or more slots to serve as a mechanical attachment area to couple the curve region to the main support structure.

10. The electronic device of claim 9, wherein the one or more slots can control a mismatch in arc lengths as the flexible display is bent from one direction to another.

11. The electronic device of claim 1, wherein the support for the flexible display is pocketed and relieved to allow for cable routing and other electrical component placement.

12. A support for a flexible display, the support comprising:
   a main support structure;
   at least one curve crease; and
   a curve region, wherein the curve region includes a curve support, wherein the curve support includes:
   a plurality of vertebrae having a first end and a second end, wherein each of the plurality of vertebrae can rotate in one rotational axis while providing stability in another axis, wherein each vertebra is interlocked with another vertebra at the first end and the second end, wherein the first end is opposite the second end, wherein the vertebrae nest in one another and share a common axis of rotation, wherein the common axis of rotation includes a threaded rod on one end of a first vertebra that passes through a snap slot on a same end of a second vertebra, wherein the curve support is fixed to the main support structure to help control a bending location.

13. The support of claim 12, wherein the first end and the second end of each of the plurality of vertebrae include a male interlocking feature and a female interlocking feature.

14. The support of claim 12, wherein the main support structure includes a securing fastener channel and the curve support is coupled to the main support structure using securing fasteners coupled to the securing fastener channel.

15. The support of claim 12, wherein the main support structure includes flanges to couple the flexible display to the main support structure.

16. A system, comprising:
   an electronic device; and
   a flexible display, wherein the flexible display includes a support for the flexible display, wherein the support includes:
   a main bi-stable steel support structure that includes a low stress region and at least one high stress region;
   at least one curve crease located in the high stress region; and
   a curve region located in the low stress region to allow for a relatively smooth bending of the flexible display, wherein the curve region includes a curve support, wherein the curve support includes individual vertebrae that can rotate in one rotational axis while providing stability in another axis, wherein the individual vertebrae nest in one another and share a common axis of rotation, wherein the common axis of rotation includes a threaded rod on one end of a first vertebra that passes through a snap slot on a same end of a second vertebra, wherein the curve support is fixed to the main bi-stable steel support structure to help control a bending location.

* * * * *

UNITED STATES PATENT AND TRADEMARK OFFICE
CERTIFICATE OF CORRECTION

| | | |
|---|---|---|
| PATENT NO. | : 10,310,565 B2 | Page 1 of 1 |
| APPLICATION NO. | : 15/577287 | |
| DATED | : June 4, 2019 | |
| INVENTOR(S) | : Russell S. Aoki et al. | |

It is certified that error appears in the above-identified patent and that said Letters Patent is hereby corrected as shown below:

In the Specification

Column 1, Line 2, delete "TECHNICAL FIELD" and insert --CROSS-REFERENCE TO RELATED APPLICATION(S)--, therefore Signed and Sealed this
Twenty-eighth Day of April, 2020

Andrei Iancu
*Director of the United States Patent and Trademark Office*